(12) United States Patent
Delaviz et al.

(10) Patent No.: US 8,119,701 B2
(45) Date of Patent: *Feb. 21, 2012

(54) METHOD OF MANUFACTURING POLYSTYRENE FOAM WITH POLYMER PROCESSING ADDITIVES

(75) Inventors: Yadollah Delaviz, Lewis Center, OH (US); Bharat Patel, Dublin, OH (US); Mark Polasky, Mogadore, OH (US); Raymond M. Breindel, Hartville, OH (US); Roland R. Loh, Stow, OH (US); Mitchell Z. Weekley, Tallmadge, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 628 days.

This patent is subject to a terminal disclaimer.

(21) Appl. No.: 11/257,301

(22) Filed: Oct. 24, 2005

(65) Prior Publication Data

US 2007/0090552 A1    Apr. 26, 2007

(51) Int. Cl.
*C08J 9/00* (2006.01)
*C08J 9/12* (2006.01)
*C08J 9/14* (2006.01)

(52) U.S. Cl. .................. 521/97; 521/88; 521/98; 521/79
(58) Field of Classification Search .................... 521/79, 521/88, 97, 98
See application file for complete search history.

(56) References Cited

U.S. PATENT DOCUMENTS

| | | | |
|---|---|---|---|
| 3,870,841 A * | 3/1975 | Makowski et al. | 524/132 |
| 4,698,370 A * | 10/1987 | Saeki et al. | 521/128 |
| 5,082,608 A | 1/1992 | Karabedian et al. | |
| 5,229,429 A | 7/1993 | Hahn et al. | |
| 5,258,415 A | 11/1993 | Hahn et al. | |
| 5,340,844 A * | 8/1994 | Welsh et al. | 521/82 |
| 5,356,944 A * | 10/1994 | Blythe et al. | 521/146 |
| 5,443,769 A | 8/1995 | Karabedian et al. | |
| 5,565,497 A | 10/1996 | Godbey et al. | |
| 5,674,602 A | 10/1997 | Karabedian et al. | |
| 5,925,450 A | 7/1999 | Karabedian et al. | |
| 5,997,781 A | 12/1999 | Nishikawa et al. | |
| 6,093,352 A * | 7/2000 | Miller et al. | 264/50 |

(Continued)

FOREIGN PATENT DOCUMENTS

CN    1057228    12/1991

(Continued)

OTHER PUBLICATIONS

International Search Report dated Apr. 17, 2008 in PCT/US2006/41186.

(Continued)

*Primary Examiner* — Mark Eashoo
*Assistant Examiner* — Liam Heincer
(74) *Attorney, Agent, or Firm* — Calfee, Halter & Griswold LLP

(57) ABSTRACT

Disclosed is a method for making polystyrene foam which utilizes one or more atmospheric gases, particularly combinations of HFCs and $CO_2$, as the blowing system in combination with a polymer processing aid (PPA), typically an ester that is relatively non-volatile at the extrusion temperature range. The blowing system and the PPA may both be introduced into the molten thermoplastic polystyrene resin or the PPA may be incorporated in the solid source polystyrene resins. The resulting foams will typically exhibit improved dimensional stability at ambient temperatures.

23 Claims, 21 Drawing Sheets

U.S. PATENT DOCUMENTS

| | | | |
|---|---|---|---|
| 6,225,364 B1 | 5/2001 | Chaudhary et al. | |
| 6,274,641 B1 | 8/2001 | Krupinski | |
| 6,437,048 B1* | 8/2002 | Saito et al. | 525/240 |
| 6,455,601 B1 | 9/2002 | Singh et al. | |
| 6,572,800 B1 | 6/2003 | Sainz et al. | |
| 6,710,095 B2 | 3/2004 | Araullo-McAdams et al. | |
| 2003/0035660 A1* | 2/2003 | Sugino et al. | 399/111 |
| 2004/0014830 A1 | 1/2004 | Wiese et al. | |
| 2004/0143068 A1* | 7/2004 | Honda et al. | 525/199 |
| 2004/0162359 A1 | 8/2004 | Barber et al. | |
| 2004/0186194 A1 | 9/2004 | Joern et al. | |
| 2004/0242715 A1 | 12/2004 | Loh et al. | |
| 2005/0112356 A1 | 5/2005 | Rynd et al. | |
| 2005/0260400 A1 | 11/2005 | Schweitzer et al. | |
| 2006/0148916 A1 | 7/2006 | Kloh et al. | |
| 2007/0142487 A1 | 6/2007 | Miller et al. | |
| 2007/0173554 A1 | 7/2007 | Delaviz et al. | |
| 2007/0208094 A1 | 9/2007 | Handa et al. | |
| 2007/0213418 A1 | 9/2007 | Vermilion et al. | |
| 2011/0144221 A1 | 6/2011 | Delaviz et al. | |

FOREIGN PATENT DOCUMENTS

| | | |
|---|---|---|
| CN | 1170662 | 1/1998 |
| DE | 102 41 298 | 3/2004 |
| EP | 0 276 452 | 8/1988 |
| WO | WO 95/04765 | 2/1995 |
| WO | WO 96/30439 | 10/1996 |
| WO | WO 99/31170 | 6/1999 |
| WO | WO-0129140 A1 * | 4/2001 |
| WO | WO 03/014220 | 2/2003 |
| WO | 2007/050468 | 5/2007 |
| WO | 2007/050478 | 5/2007 |
| WO | 2009/148445 | 12/2009 |

OTHER PUBLICATIONS

Database WPI Week 2000604; Mitsubishi Plastics; XP002514223 dated Dec. 15, 2005.
Database WPI Week 199816; Kanebuchi; XP002514224 dated Feb. 10, 1998.
International Search Report PCT/US2006/041121 dated May 29, 2008.
international Search Report PCT/US2006/041186 dated Apr. 14, 2008.
International Search Report PCT/US2008/065780 dated Feb. 23, 2009.
Office action from U.S. Appl. No. 11/259,970 dated Dec. 13, 2007.
Office action from U.S. Appl. No. 11/259,970 dated Aug. 5, 2008.
Interview Summary from U.S. Appl. No. 11/259,970 dated Sep. 29, 2008.
Office action from Chinese Application No. 200680044295.6 dated Jul. 28, 2011.
Office action from Chinese Application No. 200680044295.6 dated Nov. 3, 2010.
Notice of Panel Decision from Pre-Appeal Brief Request from U.S. Appl. No. 11/259,970 dated Nov. 6, 2008.
Examiner's Answer from U.S. Appl. No. 11/259,970 dated May 13, 2009.
Office action from U.S. Appl. No. 11/259,970 dated Oct. 5, 2009.
Office action from U.S. Appl. No. 11/259,970 dated Sep. 16, 2010.
Office action from U.S. Appl. No. 11/259,970 dated Jan. 20, 2011.
Office action from U.S. Appl. No. 11/259,970 dated Sep. 1, 2011.
Interview Summary from U.S. Appl. No. 11/259,970 dated Sep. 29, 2011.

* cited by examiner

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | Califoam H-800X-50HC actual % | HFC-32 % | 142b % |
|---|---|---|---|---|---|---|---|---|---|---|---|---|
| 13-1 | 92.8 | | | | | 3.7 | | | | | | |
| 13-2 | 92.8 | | | | | 3.7 | | | | | | |
| 13-3 | 92.8 | | | | | 3.7 | | | | | | |
| 13-4 | 92.8 | | | | | 3.7 | | | | | | |
| 13-5 | 90.3 | | | | | 3.7 | | | | | | |
| 13-6 | 90.3 | | | | | 3.7 | | | | | | |
| 13-7 | 90.3 | | | | | 3.7 | | | | | | |
| 13-8 | 90.3 | | | | | 3.7 | | | | | | |
| 14-1 | 92.8 | | | | | | 5.5 | | | | | |
| 14-2 | 92.8 | | | | | | 7.0 | | | | | |
| 31-1 | | 97.1 | | | | 4.3 | | | | | | |
| 31-2 | | 98.5 | | | | 4.3 | | | | | | |
| 31-3 | | 98.3 | | | | 4.3 | | | | | | |
| 31-4 | | 98.1 | | | | 4.3 | | | | | | |
| 31-5 | | 98.1 | | | | 3.7 | | | | | | |
| 33-1 | 98.6 | | | | | 3.7 | | | | | | |
| 33-2 | 98.6 | | | | | 3.7 | | | | | | |
| 33-3 | 98.5 | | | | | 4.0 | | | | | | |
| 33-4 | 98.5 | | | | | 4.0 | | | | | | |

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | Cellfoam H-800X-50HC actual % | HFC-32 % | 142b % |
|---|---|---|---|---|---|---|---|---|---|---|---|---|
| 33-6 | 98.5 | | | | | 4.0 | | | | | | |
| 33-7 | 98.5 | | | | | 4.3 | | | | | | |
| 35-1 | 98.7 | | | | | | 7.0 | | | | | |
| 35-2 | 98.7 | | | | | | 7.0 | | | | | |
| 35-3 | 98.7 | | | | | | 7.0 | | | | | |
| 35-4 | 98.7 | | | | | | 7.0 | | | | | |
| 37-1 | 97.4 | | | | | | 7.0 | | | | | |
| 37-2 | 97.4 | | | | | | 7.0 | | | | | |
| 37-3 | 97.4 | | | | | | 8.0 | | | | | |
| 37-4 | 97.4 | | | | | | 8.0 | | | | | |
| 42-2 | 99.0 | | | | | | 7.0 | | | | | |
| 42-3 | 99.0 | | | | | | 7.0 | | | | | |
| 43-2 | 98.3 | | | | | 3.7 | | | | | | |
| 43-5 | | | | 98.3 | | 3.7 | | | | | | |
| 44-2 | | | | 98.3 | | 3.7 | | | | | | |
| 44-3 | | | | 98.3 | | 4.0 | | | | | | |

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | CellFoam H-800X-50HC actual % | HFC-32 % | 142b % |
|---|---|---|---|---|---|---|---|---|---|---|---|---|
| 45-2 |  |  | 98.3 |  |  | 3.7 |  |  |  |  |  |  |
| 45-4 |  |  | 98.8 |  |  | 3.7 |  |  |  |  |  |  |
| 45-6 |  |  | 98.5 |  |  | 3.7 |  |  |  |  |  |  |
| 45-7 |  |  | 98.0 |  |  | 3.7 |  |  |  | 0.50 |  |  |
| 46-1 |  |  | 98.3 |  |  | 3.7 |  |  |  |  |  |  |
| 46-2 |  |  | 98.3 |  |  | 3.7 |  |  |  |  |  |  |
| 46-3 |  |  |  | 98.3 |  | 3.7 |  |  |  |  |  |  |
| 46-4 |  |  |  | 98.3 |  | 3.7 |  |  |  |  |  |  |
| 47-2 | 98.3 |  |  |  |  | 3.7 |  |  |  |  |  |  |
| 47-4 | 73.3 | 25.0 |  |  |  | 3.7 |  |  |  |  |  |  |
| 47-6 | 68.3 | 25.0 |  |  |  | 3.7 |  |  |  |  |  |  |
| 47-8 | 68.3 | 25.0 |  |  |  | 3.7 |  |  |  |  |  |  |
| 48-2 | 98.8 |  |  |  |  | 3.7 |  |  |  |  |  |  |
| 48-4 | 73.8 | 25.0 |  |  |  | 3.7 |  |  |  | 0.50 |  |  |
| 48-6 | 73.8 | 25.0 |  |  |  | 3.7 |  |  |  | 0.50 |  |  |
| 49-1 | 73.3 | 25.0 |  |  |  | 3.7 |  |  |  | 0.50 |  |  |
| 49-2 | 48.3 | 50.0 |  |  |  | 3.7 |  |  |  |  |  |  |
| 49-3 | 23.3 | 75.0 |  |  |  | 3.7 |  |  |  |  |  |  |

Page 3 of 7

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | Cellfoam H-800X-50HC actual % | HFC-32 % | 142b % |
|---|---|---|---|---|---|---|---|---|---|---|---|---|
| 49-4 | 98.3 | | | | | 3.7 | | | | | | |
| 50-2 | 73.8 | 25.0 | | | | 3.7 | | | 0.50 | | | |
| 50-4 | 73.8 | 25.0 | | | | 2.7 | 2.0 | | 0.50 | | | |
| 50-6 | 73.8 | 25.0 | | | | 1.7 | 4.0 | | 0.50 | | | |
| 51-7 | 98.7 | | | | | | 7.0 | | | | | |
| 51-9 | 98.7 | | | | | 1.0 | 7.0 | | | | | |
| 52-3 | 97.8 | | | | | 1.5 | 6.0 | | | | | |
| 52-5 | 73.8 | 25.0 | | | | 1.5 | 6.0 | | | | | |
| 53-2 | 98.5 | | | | | 1.5 | 7.0 | | | | | |
| 53-4 | 98.5 | | | | | 2.5 | 5.0 | | | | | |
| 53-6 | 73.5 | 25.0 | | | | 2.5 | 5.0 | | | | | |
| 53-8 | 74.0 | 25.0 | | | | 2.0 | 4.0 | | | | | |
| 54-3 | 98.5 | | | | | 2.5 | 5.0 | | 0.50 | | | |
| 54-6 | 98.5 | | | | | 2.3 | | 5.00 | | | | |
| 57-1 | 73.3 | 25.0 | | | | 2.5 | 5.0 | | | | | |
| 57-2 | 73.3 | 25.0 | | | | 2.5 | 5.0 | | | | | |

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | Califoam H-800X-50HC actual % | HFC-32 % | 142b % |
|---|---|---|---|---|---|---|---|---|---|---|---|---|
| 57-3 | 73.3 | 25.0 | | | | 2.5 | 5.0 | | | | | |
| 58-2 | 73.8 | 25.0 | | | | 2.5 | 3.8 | | 0.25 | | | |
| 58-4 | 73.8 | 25.0 | | | | 2.5 | 2.5 | | 0.50 | | | |
| 58-6 | 73.8 | 25.0 | | | | 2.5 | 1.5 | | 0.75 | | | |
| 59-2 | 73.3 | 25.0 | | | | 2.0 | 3.5 | | 0.25 | | | |
| 59-4 | 73.3 | 25.0 | | | | 2.0 | 3.5 | | 0.50 | | | |
| 59-6 | 73.3 | 25.0 | | | | 1.5 | 4.5 | | 0.50 | | | |
| 59-8 | 73.3 | 25.0 | | | | 1.0 | 5.5 | | 0.50 | | | |
| 59-10 | 73.3 | 25.0 | | | | 0.5 | 6.5 | | 0.50 | | | |
| 60-2 | 73.3 | 25.0 | | | | 1.5 | 4.5 | | 0.50 | | | |
| 61-2 | 73.3 | 25.0 | | | | 1.5 | 4.5 | | 0.50 | | | |
| 61-3 | 73.3 | 25.0 | | | | 1.5 | 4.5 | | 0.50 | | | |
| 62-2 | 73.5 | 25.0 | | | | 2.3 | | 5.00 | | | | |
| 62-3 | 73.5 | 25.0 | | | | 2.3 | | 5.00 | | | | |
| 62-5 | 98.5 | | | | | 2.3 | | 5.00 | | | | |
| 62-6 | 98.5 | | | | | 2.3 | | 5.00 | | | | |

FIG. 3
RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | CellFoam H-800X-50HC actual % | HFC-32 % | 142b % |
|---|---|---|---|---|---|---|---|---|---|---|---|---|
| 62-7 | 98.5 | | | | | 2.3 | | 5.00 | | | | |
| 63-2 | 98.8 | | | | | | | | | | | 11.0 |
| 64-1 | 98.8 | | | | | | | | | | | |
| 64-2 | 98.8 | | | | | | | | | | | |
| 64-4 | 98.8 | | | | | | | | | 5.7 | | |
| 64-5 | 98.3 | | | | | 2.5 | | | | 5.7 | | |
| 64-6 | 98.8 | | | | | 2.5 | | | | 5.7 | | |
| 64-8 | 98.8 | | | | | 2.5 | | | | 3.5 | | |
| 65-2 | 73.5 | 25.0 | | | | 2.3 | 4.39 | | | 3.5 | | |
| 65-3 | 73.5 | 25.0 | | | | 2.3 | 4.39 | | | 3.5 | | |
| 65-5 | 98.5 | | | | | 2.3 | 4.39 | | | | | |
| 65-6 | 98.5 | | | | | 2.3 | 4.39 | | | | | |
| 66-2 | 73.5 | 25.0 | | | | 2.5 | 5.0 | | | | | |
| 66-3 | 73.5 | 25.0 | | | | 2.5 | 5.0 | | | | | |
| 66-5 | | | | 98.5 | | 2.5 | 5.0 | | | | | |
| 66-6 | | | | 98.5 | | 2.5 | 5.0 | | | | | |
| 67-1 | | | | 98.6 | | 2.5 | 5.0 | | | | | |

FIG. 3

RESIN COMPOSITION AND BLOWING AGENTS

| Sample Code | Nova NC 0038 (%) | Nova NN 0044 (%) | Nova 3100 (%) | Nova 1600 (%) | Nova PD 3293 (%) | CO2 (%) | 134a (%) | 134a/152a 80:20 blend (%) | 134a/152a 87:13 blend (%) | CellFoam H-800X-50HC actual % | HFC-32 % | 142b % |
|---|---|---|---|---|---|---|---|---|---|---|---|---|
| 67-2 | | | | | 97.8 | 2.5 | 5.0 | | | | | |
| 67-3 | | | | | 98.0 | 2.5 | 5.0 | | | | | |
| 67-4 | | | | | 98.0 | 2.5 | 5.0 | | | | | |

FIG. 4
COMPOSITION ADDITIVES

| Sample Code | Polyjad 721 | Liquid Additive 109 (%) | Liquid Additive 111 (%) | Liquid Additive PF681 (%) | Additive as pellet actual % | APS 897 actual % | EVAL 171b actual % | VIBA 06608 actual % | OPTIMA TC 221 actual% | LOTRYL 28 MA 07 actual% | XP-808 actual% | LBD Talc % | Std HBCD % | Color % |
|---|---|---|---|---|---|---|---|---|---|---|---|---|---|---|
| 13-1 | | | | | 0.78 | | | | | | | 0.20 | 1.00 | 0.00 |
| 13-2 | | | | | 0.78 | | | | | | | 0.20 | 1.00 | 0.00 |
| 13-3 | | | | | 0.78 | | | | | | | 0.20 | 1.00 | 0.00 |
| 13-4 | | | | | 0.78 | | | | | | | 0.20 | 1.00 | 0.00 |
| 13-5 | | | | | 0.78 | 0.225 | 1.5 | | | | | 0.20 | 1.00 | 0.00 |
| 13-6 | | | | | 0.78 | 0.225 | 1.5 | | | | | 0.20 | 1.00 | 0.00 |
| 13-7 | | | | | 0.78 | 0.225 | 1.5 | | | | | 0.20 | 1.00 | 0.00 |
| 13-8 | | | | | 0.78 | 0.225 | 1.5 | | | | | 0.20 | 1.00 | 0.00 |
| 14-1 | | | | | 0.78 | | | | | | | 0.20 | 1.00 | 0.00 |
| 14-2 | | | | | 0.78 | | | | | | | 0.20 | 1.00 | 0.00 |
| 31-1 | 1.5 | | | | | | | 0.45 | 0.15 | | | 0.40 | 1.00 | 0.00 |
| 31-2 | 1.5 | | | | | | | | 0.30 | | | 0.40 | 1.00 | 0.00 |
| 31-3 | 1.5 | | | | | | | | 0.50 | | | 0.40 | 1.00 | 0.00 |
| 31-4 | 1.5 | | | | | | | | 0.50 | | | 0.40 | 1.00 | 0.00 |
| 31-5 | 1.5 | | | | | | | | | | | 0.40 | 1.00 | 0.00 |
| 33-1 | 1.5 | | | | | | | | 0.25 | | | 0.20 | 1.00 | 0.04 |
| 33-2 | 1.5 | | | | | | | | 0.25 | | | 0.20 | 1.00 | 0.04 |
| 33-3 | 1.5 | | | | | | | | 0.28 | | | 0.20 | 1.00 | 0.08 |
| 33-4 | 1.3 | | | | | | | | | 0.28 | | 0.20 | 1.00 | 0.08 |
| 33-6 | 1.0 | | | | | | | | | 0.28 | | 0.20 | 1.00 | 0.08 |
| 33-7 | | | | | | | | | | 0.28 | | 0.20 | 1.00 | 0.08 |
| 35-1 | 1.5 | | | | | | | 0.07 | | 0.20 | | 0.05 | 1.00 | 0.08 |
| 35-2 | 1.5 | | | | | | | 0.07 | | 0.20 | | 0.05 | 1.00 | 0.08 |
| 35-3 | 1.5 | | | | | | | | | | | 0.05 | 1.00 | 0.08 |
| 35-4 | 1.5 | | | | | | | | | | | 0.05 | 1.00 | 0.08 |
| 37-1 | 1.5 | | | | | | | 0.45 | | | | 0.20 | 1.00 | 0.08 |
| 37-2 | 1.5 | | | | | | | 0.45 | | | | 0.20 | 1.00 | 0.08 |
| 37-3 | 1.5 | | | | | | | 0.45 | | | | 0.20 | 1.00 | 0.08 |
| 37-4 | 1.5 | | | | | | | 0.45 | | | | 0.20 | 1.00 | 0.08 |

Page 1 of 4

FIG. 4
COMPOSITION ADDITIVES

| Sample Code | Polyad 721 | Liquid Additive 109 (%) | Liquid Additive 111 (%) | Liquid Additive PF681 (%) | Additive as pellet actual (%) | APS 897 actual % | EVAL 177b actual % | VIBA 00608 actual % | OPTIMA TC 221 actual% | LOTRYL 28 MA 07 actual% | XP-808 actual% | LBD Talc % | Std HBCD % | Color % |
|---|---|---|---|---|---|---|---|---|---|---|---|---|---|---|
| 42-2 | | 1.5 | | | | | | 0.20 | | | | 0.00 | 1.00 | 0.00 |
| 42-3 | | 1.5 | | | | | | | | | | 0.00 | 1.00 | 0.00 |
| 43-2 | | 1.5 | | | | | 0.15 | | | | | 0.20 | 1.00 | 0.00 |
| 43-5 | | 1.5 | | | | | 0.15 | | | | | 0.20 | 1.00 | 0.00 |
| 44-2 | | | 1.5 | | | | 0.15 | | | | | 0.20 | 1.00 | 0.00 |
| 44-3 | | | 1.3 | | | | 0.15 | | | | | 0.20 | 1.00 | 0.00 |
| 45-2 | | | | 1.5 | | | | | | | | 0.20 | 1.00 | 0.00 |
| 45-4 | | | | 1.5 | | | | 0.15 | | | | 0.20 | 1.00 | 0.00 |
| 45-6 | | | | 1.5 | | | | | | | | 0.50 | 1.00 | 0.00 |
| 45-7 | | | | 1.5 | | | | | | | | 0.00 | 1.00 | 0.00 |
| 46-1 | | 1.5 | | | | | 0.15 | | | | | 0.20 | 1.00 | 0.00 |
| 46-2 | | 1.5 | | | | | 0.15 | | | | | 0.20 | 1.00 | 0.00 |
| 46-3 | | 1.5 | | | | | 0.15 | | | | | 0.20 | 1.00 | 0.00 |
| 46-4 | | 1.5 | | | | | 0.15 | | | | | 0.20 | 1.00 | 0.00 |
| 47-2 | | 1.5 | | | | | 0.15 | | | | | 0.20 | 1.00 | 0.00 |
| 47-4 | | 1.5 | | | | | 0.15 | | | | | 0.20 | 1.00 | 0.00 |
| 47-6 | | 1.5 | | | | | 0.15 | | | | 0.50 | 0.20 | 0.00 | 0.00 |
| 47-8 | | 1.5 | | | | | 0.15 | | | | 0.10 | 0.20 | 0.00 | 0.00 |
| 48-2 | | 1.5 | | | | | 0.15 | | | | | 0.20 | 1.00 | 0.00 |
| 48-4 | | 1.5 | | | | | 0.15 | | | | | 0.20 | 1.00 | 0.00 |
| 48-6 | | 1.5 | | | | | 0.15 | | | | | 0.20 | 1.00 | 0.00 |
| 49-1 | | 1.5 | | | | | 0.15 | | | | | 0.20 | 1.00 | 0.00 |
| 49-2 | | 1.5 | | | | | 0.15 | | | | | 0.20 | 1.00 | 0.00 |
| 49-3 | | 1.5 | | | | | 0.15 | | | | | 0.20 | 1.00 | 0.00 |
| 49-4 | | 1.5 | | | | | 0.15 | | | | | 0.20 | 1.00 | 0.00 |

FIG. 4
COMPOSITION ADDITIVES

| Sample Code | Polyad 721 | Liquid Additive 109 (%) | Liquid Additive 111 (%) | Liquid Additive PF691 (%) | Additive as pellet actual% | APS 897 actual% | EVAL 1716 actual% | VIBA 00608 actual% | OPTIMA TC 221 actual% | LOTRYL 28 MA 07 actual% | XP-808 actual% | LBD Talc % | Std HBCD % | Color % |
|---|---|---|---|---|---|---|---|---|---|---|---|---|---|---|
| 50-2 | | 1.5 | | | | | | | | | | 0.20 | 0.00 | 0.00 |
| 50-4 | | 1.5 | | | | | | | | | | 0.20 | 0.00 | 0.00 |
| 50-6 | | 1.5 | | | | | | | | | | 0.20 | 0.00 | 0.00 |
| 51-7 | | 1.5 | | | | | | | | | | 0.05 | 1.00 | 0.08 |
| 51-9 | | 1.5 | | | | | | | | | | 0.05 | 1.00 | 0.08 |
| 52-3 | 1.0 | 1.5 | | | | | | | | 0.28 | | | | |
| 52-5 | 1.0 | 1.5 | | | | | | | | 0.28 | | | | |
| 53-2 | | | 1.5 | | | | | 0.33 | | | | 0.05 | | 0.00 |
| 53-4 | | | 1.5 | | | | | 0.33 | | 0.20 | | 0.05 | | 0.00 |
| 53-6 | | | 1.5 | | | | | 0.33 | | 0.20 | | | | 0.00 |
| 53-8 | | | 1.5 | | | | | 0.00 | | | | | | 0.00 |
| 54-3 | | | 1.5 | | | | | 0.11 | | | | 0.20 | 1.00 | 0.00 |
| 54-6 | | | 1.5 | | | | | 0.11 | | | | 0.20 | 1.00 | 0.00 |
| 57-1 | | 1.3 | | | | | | 0.15 | | | | 0.20 | 1.00 | |
| 57-2 | | 1.3 | | | | | | 0.15 | | | | 0.20 | 1.00 | |
| 57-3 | | 1.3 | | | | | | 0.15 | | | | 0.05 | 1.00 | |
| 58-2 | | 1.5 | | | | | | 0.15 | | | | 0.20 | | |
| 58-4 | | 1.5 | | | | | | 0.15 | | | | 0.20 | | |
| 58-6 | | 1.5 | | | | | | 0.15 | | | | 0.20 | | |
| 59-2 | | 1.5 | | | | | | 0.33 | | | | 0.20 | 0.00 | 0.00 |
| 59-4 | | 1.5 | | | | | | 0.15 | | | | 0.20 | 0.00 | 0.00 |
| 59-6 | | 1.5 | | | | | | 0.15 | | | | 0.20 | 0.00 | 0.00 |
| 59-8 | | 1.5 | | | | | | 0.15 | | | | 0.20 | 0.00 | 0.00 |
| 59-10 | | 1.5 | | | | | | 0.15 | | | | 0.20 | 0.00 | 0.00 |
| 60-2 | | 2.0 | | | | | | 0.15 | | | | 0.20 | | |

Page 3 of 4

FIG. 4

COMPOSITION ADDITIVES

| Sample Code | Polyiad 721 | Liquid Additive 109 (%) | Liquid Additive 111 (%) | Liquid Additive PF681 (%) | Additive as pellet actual % | APS 897 actual % | EVAL 171b actual % | VIBA 00608 actual % | OPTIMA TC 221 actual% | LOTRYL 28 MA 07 actual% | XP-808 actual% | LBD Talc % | Std HBCD % | Color % |
|---|---|---|---|---|---|---|---|---|---|---|---|---|---|---|
| 61-2 |  |  | 1.5 |  |  |  |  | 0.15 |  |  |  | 0.20 | 0.00 | 0.00 |
| 61-3 |  |  | 1.5 |  |  |  |  | 0.15 |  |  |  | 0.20 | 0.00 | 0.00 |
| 62-2 |  |  | 1.5 |  |  |  |  | 0.09 |  |  |  | 0.20 | 1.00 |  |
| 62-3 |  |  | 1.5 |  |  |  |  | 0.09 |  |  |  | 0.20 | 1.00 |  |
| 62-5 |  |  | 1.5 |  |  |  |  | 0.09 |  |  |  | 0.20 | 1.00 |  |
| 62-6 |  |  | 1.5 |  |  |  |  | 0.09 |  |  |  | 0.20 | 1.00 |  |
| 62-7 |  |  | 1.5 |  |  |  |  | 0.09 |  |  |  | 0.20 | 1.00 |  |
| 63-2 |  |  |  |  |  |  |  |  |  |  |  | 0.20 | 1.00 |  |
| 64-1 |  |  | 1.5 |  |  |  |  | 0.15 |  |  |  | 0.20 | 1.00 |  |
| 64-2 |  |  | 1.5 |  |  |  |  |  |  |  |  | 0.20 | 1.00 |  |
| 64-4 |  |  | 1.5 |  |  |  |  |  |  |  |  | 0.20 | 1.00 |  |
| 64-5 |  |  | 1.5 |  |  |  |  |  |  |  |  | 0.20 | 1.00 |  |
| 64-6 |  |  | 1.5 |  |  |  |  |  |  |  |  | 0.20 | 1.00 |  |
| 64-8 |  |  | 1.5 |  |  |  |  |  |  |  |  | 0.20 | 1.00 |  |
| 65-2 |  |  | 1.5 |  |  |  |  | 0.15 |  |  |  | 0.20 | 1.00 |  |
| 65-3 |  |  | 1.5 |  |  |  |  | 0.15 |  |  |  | 0.20 | 1.00 |  |
| 65-5 |  |  | 1.5 |  |  |  |  | 0.15 |  |  |  | 0.20 | 1.00 |  |
| 65-6 |  |  | 1.5 |  |  |  |  | 0.15 |  |  |  | 0.20 | 1.00 |  |
| 66-2 |  |  | 1.5 |  |  |  |  | 0.15 |  |  |  | 0.20 | 1.00 |  |
| 66-3 |  |  | 1.5 |  |  |  |  | 0.15 |  |  |  | 0.20 | 1.00 |  |
| 66-5 |  |  | 1.5 |  |  |  |  | 0.15 |  |  |  | 0.20 | 1.00 |  |
| 66-6 |  |  |  |  |  |  |  |  |  |  |  | 0.20 | 1.00 |  |
| 67-1 | 0.3 |  | 1.5 |  |  |  |  |  |  |  |  | 0.20 | 1.00 |  |
| 67-2 | 1.0 |  | 1.5 |  |  |  |  |  |  |  |  | 0.20 | 1.00 |  |
| 67-3 | 1.0 |  | 1.5 |  |  |  |  |  |  |  |  | 0.00 | 1.00 |  |
| 67-4 | 1.0 |  | 1.5 |  |  |  |  |  |  |  |  | 0.00 | 1.00 |  |

FIG. 5

VACUUM, CELL AND FOAM PROPERTIES

| Sample Code | Vacuum Level (in) | Untrimmed Width (in) | Thickness (in) | Thickness Range | Density (PCF) | x-cell | y-cell | z-cell | cell avg (mm) | cell x:z | 11 day compressive (psi) | 11 day compressive modulus | 30 day compressive (psi) | 30 day compressive modulus | Oxygen Index | Open Cell % | Water absorption % by volume | Dimensional Stability Length (%) | Dimensional Stability Width (%) | Dimensional Stability Gauge (%) |
|---|---|---|---|---|---|---|---|---|---|---|---|---|---|---|---|---|---|---|---|---|
| 13-1 | 0 | 23.750 | 1.000 | 0.027 | 2.74 | 0.193 | 0.215 | 0.21 | 0.205 | 0.92 | 38.89 | 1512.40 | 41.57 | 1528.4 | | 3.71 | Length 0.03% Width 0.11% Gauge 5.09% | Length 0.06% Width 0.01% Gauge 4.35% | Length 0.01% Width 0.05% Gauge 4.17% | Length 0.03% Width 0.05% Gauge 4.54% |
| 13-2 | 8 | 25.250 | 1.034 | 0.034 | 2.17 | 0.216 | 0.237 | 0.218 | 0.224 | 0.99 | | | | | | | | | | |
| 13-3 | 12 | 26.687 | 0.997 | 0.066 | 1.90 | 0.218 | 0.243 | 0.223 | 0.228 | 0.98 | 18.67 | 594.00 | 21.02 | 594.6 | | 8.17 | | | | |
| 13-4 | 16 | 24.250 | 0.966 | 0.047 | 2.70 | 0.161 | 0.187 | 0.18 | 0.176 | 0.89 | | | | | | | | | | |
| 13-5 | 0 | 25.437 | 1.009 | 0.027 | 2.16 | 0.158 | 0.197 | 0.184 | 0.180 | 0.86 | 36.02 | 1453.00 | 35.96 | 1453.3 | | 35.10 | | | | |
| 13-6 | 8 | | | | | | | | | | | | | | | | | | | |
| 13-7 | 12 | 26.125 | 1.036 | 0.048 | 1.88 | 0.162 | 0.188 | 0.184 | 0.178 | 0.88 | 16.42 | 627.90 | 16.35 | 637.1 | | 45.43 | Length 0.26% Width 0.15% Gauge 0.97% | Length 0.25% Width 0.12% Gauge 1.88% | Length 0.26% Width 0.12% Gauge 2.01% | Length 0.25% Width 0.13% Gauge 1.62% |
| 13-8 | 16 | 26.750 | 1.238 | 0.173 | 1.78 | 0.161 | 0.192 | 0.186 | 0.180 | 0.87 | NFT | | | | | | | | | |
| 14-1 | 0 | 20.750 | 0.967 | 0.037 | 3.72 | 0.265 | 0.238 | 0.191 | 0.231 | 1.39 | NFT | | | | | 2.07 | | | | |
| 14-2 | 0 | 21.125 | 1.001 | 0.042 | 3.25 | 0.177 | 0.174 | 0.152 | 0.168 | 1.16 | NFT | | | | | | | | | |
| 31-1 | 0 | 25.500 | 0.887 | 0.088 | 2.63 | 0.141 | 0.167 | 0.159 | 0.156 | 0.89 | | | 39.42 | 1534.9 | | 58.53 | | | | |
| 31-2 | 0 | 25.500 | 0.889 | 0.029 | 2.53 | 0.143 | 0.153 | 0.147 | 0.148 | 0.97 | | | 40.03 | 1699.4 | | 58.45 | | | | |
| 31-3 | 0 | 26.125 | 0.870 | 0.052 | 2.57 | 0.138 | 0.15 | 0.142 | 0.143 | 0.97 | | | | | | | | | | |
| 31-4 | 0 | 26.250 | 0.867 | 0.053 | 2.68 | 0.139 | 0.16 | 0.146 | 0.148 | 0.95 | | | 40.87 | 1458.4 | | 64.55 | | | | |
| 31-5 | 0 | 24.500 | 0.754 | 0.043 | 3.26 | 0.154 | 0.18 | 0.152 | 0.162 | 1.01 | | | | | | 66.24 | | | | |
| 33-1 | 11 | 24.250 | 1.055 | 0.012 | 2.00 | 0.179 | 0.194 | 0.193 | 0.189 | 0.93 | | | 22.33 | 915.1 | | 5.16 | | | | |
| 33-2 | 11 | 23.750 | 1.025 | 0.019 | 2.07 | 0.189 | 0.197 | 0.193 | 0.193 | 0.98 | | | | | | 15.94 | | | | |
| 33-3 | 11 | 26.250 | 1.044 | 0.028 | 1.88 | 0.180 | 0.198 | 0.213 | 0.200 | 0.85 | | | | | | 4.94 | | | | |
| 33-4 | 11 | 25.500 | 1.035 | 0.020 | 1.90 | 0.171 | 0.198 | 0.201 | 0.190 | 0.85 | OCC Only | | 23.57 | 1039.8 | | 4.94 | | | | |
| 33-6 | 11 | 25.000 | 1.039 | 0.033 | 1.90 | 0.167 | 0.187 | 0.194 | 0.183 | 0.86 | | | | | | 5.20 | | | | |
| 33-7 | 11 | 25.750 | 0.886 | 0.074 | 1.85 | 0.181 | 0.227 | 0.213 | 0.207 | 0.85 | | | 24.76 | 1036.2 | | 3.39 | | | | |
| 35-1 | 0 | 22.375 | 1.008 | 0.041 | 3.50 | 0.203 | 0.21 | 0.176 | 0.196 | 1.15 | NFT | | | | | | | | | 0.08 |
| 35-2 | 11 | 23.625 | 1.040 | 0.028 | 2.42 | 0.239 | 0.24 | 0.207 | 0.229 | 1.15 | | | 31.94 | 789.9 | | 2.59 | Length 0.03% Width 0.42% Gauge 3.57% | Length 0.35% Width 0.26% Gauge 3.39% | Length 0.03% Width 0.35% Gauge 4.23% | Length 0.10% Width 0.34% Gauge 3.73% |
| 35-3 | 0 | 22.812 | 0.972 | 0.023 | 3.65 | 0.249 | 0.242 | 0.19 | 0.227 | 1.31 | NFT | | | | | | | | | |

Page 1 of 4

FIG. 5
VACUUM, CELL AND FOAM PROPERTIES

| Sample Code | Vacuum Level (in) | Untrimmed Width (in) | Thickness (in) | Thickness Range (in) | Density (PCF) | x-cell | y-cell | x-cell | cell avg (mm) | cell x:z | 11 day compressive (psi) | 11 day compressive modulus (psi) | 30 day compressive (psi) | 30 day compressive modulus (psi) | Oxygen Index | Open Cell % | Water absorption % by volume | Dimensional Stability Length (%) | Dimensional Stability Width (%) | Dimensional Stability Gauge (%) |
|---|---|---|---|---|---|---|---|---|---|---|---|---|---|---|---|---|---|---|---|---|
| 35-4 | 11 | 23.875 | 1.026 | 0.022 | 2.42 | 0.257 | 0.259 | 0.214 | 0.243 | 1.20 | | 29.83 | 691.2 | 1.98 | 0.12 | Length 0.36% Width 0.39% Gauge 4.00% | Length 0.57% Width 0.01% Gauge 5.18% | Length 0.22% Width 0.19% Gauge 6.42% | Length 0.38% Width 0.19% Gauge 5.20% |
| 37-1 | 0 | 21.875 | 0.944 | 0.052 | 3.33 | NFT | 0.248 | 0.205 | 0.233 | 1.20 | | | | 2.05 | | | | | | |
| 37-2 | 11 | 24.125 | 1.050 | 0.026 | 2.33 | 0.247 | | | | | | | | | | | | | | |
| 37-3 | 0 | 22.062 | 0.979 | 0.043 | 3.20 | NFT | | | | | | | | | | | | | | |
| 37-4 | 11 | 22.625 | 1.081 | 0.042 | 2.22 | 0.163 | 0.17 | 0.156 | 0.163 | 1.04 | | | | 0.77 | | | | | | |
| 42-2 | 11 | 20.812 | 1.528 | 0.025 | 2.29 | 0.155 | 0.171 | 0.171 | 0.166 | 0.91 | | 47.12 | 1647.6 | 2.08 | | | | | | |
| 42-3 | 11 | 21.000 | 1.493 | 0.035 | 2.31 | 0.224 | 0.22 | 0.21 | 0.218 | 1.07 | | 41.51 | 1313.8 | 2.11 | | | | | | |
| 43-2 | 11 | 24.375 | 0.872 | 0.018 | 2.02 | 0.228 | 0.235 | 0.212 | 0.225 | 1.08 | | | | | | | | | | |
| 43-5 | 11 | 24.000 | 0.961 | 0.041 | 1.96 | 0.255 | 0.266 | 0.251 | 0.261 | 1.06 | | | | 8.36 | | | | | | |
| 44-2 | 11 | 22.750 | 0.880 | 0.012 | 2.04 | 0.259 | 0.284 | 0.255 | 0.266 | 1.02 | | 18.69 | 499.4 | | | | | | | |
| 44-3 | 11 | 24.250 | 0.994 | 0.030 | 2.01 | 0.273 | 0.273 | 0.238 | 0.261 | 1.15 | | 20.01 | 420.8 | 6.58 | | | | | | |
| 45-2 | 11 | 24.250 | 0.999 | 0.020 | 1.98 | 0.274 | 0.268 | 0.242 | 0.261 | 1.13 | | 18.71 | 569.1 | 6.04 | | | | | | |
| 45-4 | 11 | 24.625 | 1.015 | 0.042 | 1.97 | 0.205 | 0.221 | 0.212 | 0.213 | 0.97 | | 19.01 | 679.2 | 4.95 | | | | | | |
| 45-6 | 11 | 25.125 | 0.987 | 0.028 | 1.95 | 0.185 | 0.189 | 0.186 | 0.190 | 0.99 | | 17.48 | 616.7 | 5.98 | | | | | | |
| 45-7 | 0 | 22.500 | 1.093 | 0.024 | 2.44 | 0.413 | 0.386 | 0.364 | 0.388 | 1.13 | NFT | | | | | | | | | |
| 46-1 | 11 | 21.000 | 0.977 | 0.028 | 2.79 | 0.254 | 0.242 | 0.239 | 0.245 | 1.06 | NFT | | | | | | | | | |
| 46-2 | 0 | 23.000 | 1.010 | 0.045 | 1.59 | 0.246 | 0.225 | 0.223 | 0.231 | 1.10 | NFT | | | 8.57 | | | | | | |
| 46-3 | 0 | 19.000 | 1.027 | 0.019 | 3.01 | 0.215 | 0.228 | 0.223 | 0.222 | 0.96 | NFT | | | | | | | | | |
| 46-4 | 11 | 21.000 | 1.115 | 0.028 | 2.08 | 0.215 | 0.246 | 0.242 | 0.234 | 0.89 | NFT | | | 49.60 | | | | | | |
| 47-2 | 11 | 22.250 | 1.043 | 0.030 | 2.13 | 0.241 | 0.258 | 0.256 | 0.252 | 0.94 | | 21.67 | 782.2 | 3.34 | | | | | | |
| 47-4 | 11 | 22.750 | 1.036 | 0.022 | 2.09 | 0.213 | 0.24 | 0.241 | 0.231 | 0.88 | | 21.34 | 684.7 | 3.92 | | | | | | |
| 47-6 | 11 | 23.500 | 1.022 | 0.025 | 2.13 | 0.216 | 0.254 | 0.249 | 0.240 | 0.87 | | | | 3.84 | | | | | | |
| 47-8 | 11 | 22.750 | 1.042 | 0.027 | 2.04 | 0.225 | 0.249 | 0.249 | 0.241 | 0.90 | | | | 3.07 | | | | | | |
| 48-2 | 11 | 23.500 | 1.037 | 0.034 | 1.84 | 0.160 | 0.188 | 0.2 | 0.183 | 0.80 | | 26.34 | 1082.7 | 2.16 | | | | | | |
| 48-4 | 11 | 24.000 | 1.078 | 0.038 | 1.85 | 0.159 | 0.193 | 0.201 | 0.184 | 0.79 | | 27.52 | 1213.9 | 2.64 | | | | | | |
| 48-6 | 11 | 24.500 | 1.085 | 0.047 | 1.81 | 0.196 | 0.24 | 0.239 | 0.225 | 0.82 | | 25.13 | 968.9 | 2.88 | | | | | | |
| 49-1 | 11 | 22.250 | 1.029 | 0.021 | 2.23 | 0.230 | 0.245 | 0.241 | 0.239 | 0.95 | | 21.77 | 798 | 3.13 | | | | | | |
| 49-2 | 11 | 23.000 | 1.038 | 0.027 | 2.02 | 0.214 | 0.228 | 0.231 | 0.228 | 0.93 | | 21.4 | 829.1 | 4.24 | | | | | | |
| 49-3 | 11 | 23.250 | 1.018 | 0.018 | 1.97 | 0.239 | 0.247 | 0.245 | 0.244 | 0.98 | | 19.11 | 800.1 | 24.35 | | | | | | |
| 49-4 | 11 | 23.750 | 0.995 | 0.016 | 1.93 | 0.229 | 0.238 | 0.229 | 0.232 | 1.00 | | 18.46 | 783.1 | 46.16 | | | | | | |

FIG. 5
VACUUM, CELL AND FOAM PROPERTIES

| Sample Code | Vacuum Level (in) | Untrimmed Width (in) | Thickness (in) | Thickness Range | Density (PCF) | x-cell | y-cell | z-cell | Cell avg (mm) | cell x:z | 11 day compressive (psi) | 11 day compressive modulus | 30 day compressive (psi) | 30 day compressive modulus | Oxygen Index | Open Cell % | Water absorption % by volume | Dimensional Stability Length (%) | Dimensional Stability Width (%) | Dimensional Stability Gauge (%) | Dimensional Stability Gauge (%) |
|---|---|---|---|---|---|---|---|---|---|---|---|---|---|---|---|---|---|---|---|---|---|
| 50-2 | 11 | 22.500 | 1.003 | 0.040 | 1.90 | 0.175 | 0.199 | 0.191 | 0.188 | 0.92 | | | 929.4 | 26.65 | | 1.11 | NFT | | | | |
| 50-4 | 11 | 19.750 | 1.069 | 0.027 | 1.98 | 0.177 | 0.186 | 0.193 | 0.185 | 0.92 | | | 1190.4 | 32.8 | | 0.85 | NFT | | | | |
| 50-6 | 11 | 19.500 | 1.053 | 0.046 | 2.04 | 0.176 | 0.173 | 0.182 | 0.177 | 0.97 | | | | | | 1.31 | | | | | |
| 51-7 | 11 | 23.625 | 1.053 | 0.023 | 2.39 | 0.224 | 0.235 | 0.193 | 0.217 | 1.16 | | | | | | | NFT | | | | |
| 51-9 | 11 | 23.500 | 1.064 | 0.031 | 2.28 | 0.257 | 0.282 | 0.237 | 0.259 | 1.08 | | | | | | 3.52 | NFT | | | | |
| 52-3 | 11 | 23.500 | 1.022 | 0.054 | 2.05 | 0.338 | 0.338 | 0.286 | 0.321 | 1.18 | | | | | | 4.94 | NFT | | | | |
| 52-5 | 11 | 24.000 | 1.112 | 0.047 | 1.87 | 0.174 | 0.201 | 0.197 | 0.191 | 0.88 | | | | | | 2.09 | NFT | | | | |
| 53-2 | 11 | 25.000 | 0.964 | 0.020 | 2.64 | 0.271 | 0.293 | 0.233 | 0.266 | 1.16 | | | | | | 2.94 | | | | | |
| 53-4 | 11 | 25.000 | 1.040 | 0.049 | 2.32 | 0.240 | 0.26 | 0.228 | 0.243 | 1.05 | | | 838.2 | 31.49 | | 1.43 | | | | | |
| 53-6 | 11 | 26.875 | 1.050 | 0.035 | 2.20 | 0.204 | 0.234 | 0.202 | 0.213 | 1.01 | | | 818.7 | 31.53 | | 1.82 | | | | | |
| 53-8 | 11 | 29.500 | 1.070 | 0.015 | 1.83 | 0.228 | 0.282 | 0.241 | 0.250 | 0.95 | NFT | | | | | | | | | | |
| 54-3 | 13 | 24.125 | 1.058 | 0.017 | 2.12 | 0.234 | 0.242 | 0.221 | 0.232 | 1.06 | | | 640.3 | 25.6 | | 4.85 | | | | | |
| 54-6 | 13 | 23.000 | 1.076 | 0.030 | 2.05 | 0.234 | 0.239 | 0.233 | 0.235 | 1.00 | | | 752.9 | 27.11 | | 2.67 | | | | | |
| 57-1 | 11 | 23.375 | 1.010 | 0.019 | 2.41 | 0.237 | 0.274 | 0.235 | 0.249 | 1.01 | NFT | | | | | | | | | | |
| HV-757-2 | 14 | 22.125 | 1.046 | 0.030 | 2.01 | 0.253 | 0.273 | 0.238 | 0.255 | 1.06 | NFT | | | | | | | | | | |
| 57-3 | 16 | 20.750 | 1.047 | 0.041 | 1.87 | 0.258 | 0.247 | 0.223 | 0.243 | 1.16 | NFT | | | | | | | | | | |
| 58-2 | 11 | 20.500 | 1.017 | 0.069 | 2.02 | 0.177 | 0.199 | 0.206 | 0.194 | 0.86 | | | | | | | | | | | |
| 58-4 | 11 | 21.000 | 1.041 | 0.091 | 2.03 | 0.216 | 0.249 | 0.24 | 0.235 | 0.90 | | | | | | | | | | | |
| 58-6 | 11 | 23.000 | 1.074 | 0.034 | 1.84 | 0.215 | 0.258 | 0.251 | 0.241 | 0.86 | | | | | | | | | | | |
| 59-2 | 11 | 23.375 | 1.096 | 0.028 | 2.07 | 0.275 | 0.291 | 0.258 | 0.275 | 1.07 | | | 650.6 | 26.92 | | 1.93 | | | | | |
| 59-4 | 11 | 21.500 | 1.009 | 0.018 | 2.02 | 0.193 | 0.214 | 0.218 | 0.208 | 0.89 | NFT | | | | | 1.43 | | | | | |
| 59-6 | 13 | 22.500 | 1.026 | 0.026 | 2.05 | 0.187 | 0.214 | 0.205 | 0.202 | 0.91 | NFT | | | | | 3.67 | | | | | |
| 59-8 | 11 | 22.750 | 1.069 | 0.020 | 2.06 | 0.166 | 0.187 | 0.185 | 0.179 | 0.90 | NFT | | | | | 3.07 | | | | | |
| 59-10 | 11 | 23.500 | 1.042 | 0.037 | 2.05 | 0.178 | 0.195 | 0.186 | 0.186 | 0.96 | NFT | | | | | | | | | | |
| 60-2 | 11 | 22.000 | 1.044 | 0.057 | 2.09 | 0.183 | 0.208 | 0.2 | 0.197 | 0.92 | NFT | | | | | | | | | | |
| 61-2 | 11 | 20.500 | 1.080 | 0.022 | 1.91 | 0.166 | 0.191 | 0.184 | 0.180 | 0.90 | | | | | | 2.30 | | | | | |
| 61-3 | 14 | 20.500 | 1.040 | 0.024 | 1.73 | 0.189 | 0.218 | 0.21 | 0.206 | 0.90 | | | | | | 3.29 | | | | | |
| 62-2 | 11 | 22.500 | 1.079 | 0.087 | 2.05 | 0.169 | 0.197 | 0.19 | 0.185 | 0.89 | NFT | | 1177.2 | 30.45 | | 1.06 | | | | | |
| 62-3 | 13 | 21.625 | 1.102 | 0.040 | 2.02 | 0.210 | 0.212 | 0.2 | 0.200 | 0.94 | | | | 23.95 | | | | | | | |
| 62-5 | 11 | 21.750 | 1.076 | 0.072 | 2.17 | 0.202 | 0.235 | 0.217 | 0.221 | 0.97 | NFT | | 847.5 | 37.06 | | 1.26 | | | | | |
| 62-6 | 13 | 20.625 | 1.097 | 0.061 | 2.01 | 0.229 | 0.214 | 0.208 | 0.208 | 0.97 | NFT | | | 35.13 | | | | | | | |
| 62-7 | 15 | 20.250 | 1.099 | 0.080 | 1.84 | 0.229 | 0.227 | 0.226 | 0.227 | 1.01 | NFT | | | | | | | | | | |
| 63-2 | 11 | 21.375 | 1.070 | 0.046 | 1.93 | 0.260 | 0.223 | 0.215 | 0.233 | 1.21 | Check Run | | | | | | | | | | |

FIG. 5
VACUUM, CELL AND FOAM PROPERTIES

| Sample Code | Vacuum Level (in) | Untrimmed Width (in) | Thickness (in) | Thickness Range | Density (PCF) | x-cell | y-cell | z-cell | Cell avg (mm) | cell x:z | 11 day compressive (psi) | 11 day compressive modulus | 30 day compressive (psi) | 30 day compressive modulus | Oxygen Index | Open Cell % | Water absorption % by volume | Dimensional Stability Length (%) | Dimensional Stability Width (%) | Dimensional Stability Gauge (%) | Dimensional Stability Gauge (%) |
|---|---|---|---|---|---|---|---|---|---|---|---|---|---|---|---|---|---|---|---|---|---|
| 64-1 | 0 | 17.562 | 0.865 | 0.036 | 2.74 | 0.135 | 0.145 | 0.16 | 0.147 | 0.84 | | | | | 0.00 | | | | | | |
| 64-2 | 11 | 19.000 | 1.057 | 0.091 | 2.08 | 0.138 | 0.148 | 0.165 | 0.150 | 0.84 | | 41.01 | 1626.2 | | 0.05 | | | | | | |
| 64-4 | 15 | 18.250 | 1.074 | 0.099 | 1.83 | 0.136 | 0.137 | 0.163 | 0.145 | 0.83 | | | | | | | | | | | |
| 64-5 | 0 | 22.000 | 0.919 | 0.040 | 2.36 | 0.172 | 0.219 | 0.222 | 0.204 | 0.77 | | 53.1 | 1688.9 | | 0.47 | | | | | | |
| 64-6 | 0 | 20.250 | 0.915 | 0.061 | 2.61 | 0.145 | 0.17 | 0.178 | 0.164 | 0.81 | | 58.99 | 1478.3 | | 0.79 | | | | | | |
| 64-8 | 0 | 22.250 | 1.049 | 0.095 | 1.88 | 0.137 | 0.169 | 0.186 | 0.164 | 0.74 | | 42.27 | 1000.9 | | | | | | | | |
| 65-2 | 11 | 20.375 | 1.140 | 0.092 | 2.29 | 0.126 | 0.131 | 0.146 | 0.134 | 0.86 | NFT | | | | 0.00 | | | | | | |
| 65-3 | 13 | 18.750 | 1.076 | 0.054 | 2.20 | 0.128 | 0.148 | 0.165 | 0.147 | 0.78 | | | | | | | | | | | |
| 65-5 | 11 | 20.250 | 1.117 | 0.094 | 2.23 | 0.179 | 0.175 | 0.199 | 0.184 | 0.90 | NFT | | | | 0.00 | | | | | | |
| 65-6 | 13 | 19.625 | 1.102 | 0.080 | 2.12 | 0.179 | 0.186 | 0.203 | 0.189 | 0.88 | | | | | | | | | | | |
| 66-2 | 11 | 23.750 | 1.171 | 0.046 | 2.11 | 0.099 | 0.125 | 0.132 | 0.119 | 0.75 | | | | | 0.85 | | | | | | |
| 66-3 | 13 | 22.375 | 1.115 | 0.100 | 1.98 | 0.104 | 0.12 | 0.131 | 0.118 | 0.79 | NFT | | | | | | | | | | |
| 66-5 | 11 | 24.750 | 1.128 | 0.023 | 2.04 | 0.099 | 0.122 | 0.125 | 0.115 | 0.79 | | | | | 1.42 | | | | | | |
| 66-6 | 13 | 24.875 | 1.102 | 0.085 | 1.81 | 0.099 | 0.121 | 0.12 | 0.113 | 0.83 | | | | | | | | | | | |
| 67-1 | 11 | 24.500 | 1.052 | 0.054 | 2.07 | 0.085 | 0.099 | 0.11 | 0.098 | 0.77 | NFT | | | | | | | | | | |
| 67-2 | 11 | 24.250 | 1.103 | 0.125 | 2.07 | 0.089 | 0.106 | 0.111 | 0.102 | 0.80 | | | | | | | | | | | |
| 67-3 | 0 | 22.625 | 0.850 | 0.094 | 2.56 | 0.080 | 0.104 | 0.125 | 0.098 | 0.90 | | | | | | | | | | | |
| 67-4 | 11 | 26.500 | 0.973 | 0.100 | 1.90 | 0.099 | 0.107 | 0.107 | 0.104 | 0.95 | | | | | | | | | | | |

NFT = No Further Testing
OCC = Open Cell Content Only

FIG. 6

K FACTORS AND COMMENTS

| Sample Code | 8 day K-factor | 9 day K-factor | 10 day K-factor | 11 day K-factor | 12 day K-factor | 30 day K-factor | 60 day K-factor | 120 day K-factor | 180 day K-factor | 180 day K-factor (projected) | 180 day K-factor (actual) | Comments |
|---|---|---|---|---|---|---|---|---|---|---|---|---|
| 13-1 | | | | 0.240 | | 0.241 | 0.240 | 0.240 | 0.241 | 0.240 | | Good surface. |
| 13-2 | | | | 0.239 | | 0.240 | 0.239 | 0.239 | 0.240 | 0.239 | | Good surface. |
| 13-3 | | | | 0.230 | | 0.231 | 0.230 | 0.230 | 0.231 | 0.230 | | Good surface. Crowning. |
| 13-4 | | | | | | | | | | | | |
| 13-5 | | | | 0.232 | | 0.233 | 0.232 | 0.232 | 0.233 | 0.232 | | Good surface, x-cells not well formed, hard to read. |
| 13-6 | | | | | | | | | | | | Good surface, x-cells not well formed, hard to read. |
| 13-7 | | | | | | | | | | | | Good surface, x-cells not well formed, hard to read. |
| 13-8 | | | | | | | | | | | | Rough surface, x-cells not well formed, hard to read. |
| 14-1 | | | | | | | | | | | | Good surface, lack of width. Chevron & tear x-direction |
| 14-2 | | | | | | | | | | | | Fair surface, lack of width. Cevrons, layer-thin line of cells. |
| 31-1 | | 0.236 | | | | 0.234 | 0.234 | 0.234 | 0.233 | 0.234 | | Flat surface with very light gator skin. X-cells hard to read. |
| 31-2 | | 0.233 | | | | 0.232 | 0.232 | 0.232 | 0.231 | 0.232 | | Flat surface with very light gator skin. X-cells hard to read. |
| 31-3 | | 0.234 | | | | 0.232 | 0.232 | 0.232 | 0.230 | 0.232 | | Flat surface with very light gator skin. X-cells hard to read. |
| 31-4 | | 0.233 | | | | 0.231 | 0.231 | 0.231 | 0.231 | 0.231 | | Flat surface with very light gator skin. X-cells hard to read. |
| 31-5 | | 0.227 | | | | 0.226 | 0.225 | 0.225 | 0.224 | 0.226 | | Flat surface with very light gator skin. X-cells hard to read. |
| 33-1 | | | 0.238 | | | 0.237 | 0.238 | 0.237 | 0.238 | 0.237 | | Screw speed @ 19 RPM's, surface marks & edge tears. |
| 33-2 | | | | | | | | | | | | Screw speed @ 27.2 RPM's, surface marks & edge tears. |
| 33-3 | | | | | | | | | | | | Fair surface, edge tears. |
| 33-4 | | 0.240 | | | | 0.239 | 0.239 | 0.240 | 0.239 | 0.240 | | Fair surface, edge tears. |
| 33-6 | | 0.237 | | | | 0.237 | 0.237 | 0.237 | 0.237 | 0.237 | | Fair surface, edge tears. |
| 33-7 | | | | | | | | | | | | Chevrons, curled, edge tears. Cracked surface, large cell layer in center of board |
| 35-1 | | | | | | | | | | | | Flat, cold streaked surface. |
| 35-2 | 0.157 | | | | | 0.170 | 0.177 | 0.181 | 0.188 | 0.183 | | Flat, cold streaked surface. |
| 35-3 | 0.155 | | | | | | | | | | | Flat, cold streaked surface. |
| 35-4 | | | | | | 0.169 | 0.176 | 0.181 | 0.187 | 0.183 | | Flat, cold streaked surface, slight ripples on west edge. |
| 37-1 | | | | | | | | | | | | Flat, slight corrugation. |
| 37-2 | | | | | 0.162 | 0.172 | 0.178 | 0.182 | 0.189 | 0.184 | | Flat, slight corrugation. |
| 37-3 | | | | | | | | | | | | Flat, smooth surface. |
| 37-4 | | | | | 0.161 | 0.170 | 0.176 | 0.179 | 0.187 | 0.181 | | Flat, smooth surface, slight edge tears. |
| 42-2 | | 0.165 | | | | 0.177 | 0.184 | 0.188 | 0.195 | | | Edge tears, fair surface. |
| 42-3 | | 0.163 | | | | 0.176 | 0.183 | 0.188 | 0.195 | | | Edge tears, fair surface, possible layer. |

Page 1 of 4

FIG. 6

K FACTORS AND COMMENTS

| Sample Code | 8 day K-Factor | 9 day K-Factor | 10 day K-Factor | 11 day K-Factor | 12 day K-Factor | 30 day K-Factor | 60 day K-Factor | 120 day K-Factor | 180 day K-factor (projected) | 180 day K-factor (actual) | Comments |
|---|---|---|---|---|---|---|---|---|---|---|---|
| 43-2 | | | | | | | | | | | Flat surface, skin tears, edge tears. Foam soft & pliable |
| 43-5 | | | | | | | | | | | Flat smooth surface with edge tears. |
| 44-2 | | | 0.241 | | | 0.241 | 0.241 | 0.241 | 0.241 | | Flat surface with edge tears. X-cells not well formed. |
| 44-3 | | | 0.238 | | | 0.238 | 0.238 | 0.238 | 0.238 | | Flat slightly foamy surface with edge tears. |
| 45-2 | | | 0.242 | | | 0.241 | 0.242 | | 0.241 | | Flat surface with small surface tears & edge tears. |
| 45-4 | | | 0.237 | | | 0.236 | 0.236 | | 0.236 | | Flat smooth surface with edge tears. |
| 45-6 | | | 0.232 | | | 0.231 | 0.231 | | 0.231 | | Flat smooth surface with edge tears. |
| 45-7 | | | | | | | | | | | Flat surface with surface tears & edge tears. |
| 46-1 | | | | | | | | | | | Flat surface with edge tears. |
| 46-2 | | | | | | | | | | | Flat surface with edge tears. |
| 46-3 | | | | | | | | | | | Flat surface with edge tears. Cells look more fractured. |
| 46-4 | | | | | | | | | | | Flat surface with edge tears. Cells look more fractured. |
| 47-2 | | 0.236 | | | | 0.235 | 0.235 | | 0.234 | | Flat surface with small surface tears & edge tears. |
| 47-4 | | 0.236 | | | | 0.235 | 0.235 | | 0.235 | | Flat surface - improved from 47-2, edge tears. |
| 47-6 | | | | | | | | | | | Flat smooth surface with edge tears. |
| 47-8 | | | | | | | | | | | Flat smooth surface with edge tears. |
| 48-2 | | | | 0.232 | | 0.231 | | | | | Flat surface with small surface tears & edge tears. |
| 48-4 | | | | 0.237 | | 0.236 | | | | | Flat surface with small edge tears. |
| 48-6 | | | | 0.240 | | 0.240 | | | | | Flat surface with small edge tears. |
| 49-1 | | | | 0.235 | | 0.235 | 0.234 | | 0.234 | | Flat smooth surface with edge tears. |
| 49-2 | | | | | | | | | | | Flat smooth surface with edge tears. Groove on bottom surface. |
| 49-3 | | | | | | | | | | | Flat smooth surface with edge tears. Groove on bottom surface. X-cells not formed well. |
| 49-4 | | | | 0.236 | | 0.236 | 0.236 | | 0.235 | | Flat smooth surface with edge tears. X-cells not formed well. |
| 50-2 | | | 0.231 | | | 0.231 | 0.231 | | 0.231 | | Flat surface with small skin tears. Very slight gator skin surface. |
| 50-4 | | | | | | | | | | | Flat surface, skin tears are worse. Gator skin worse. |
| 50-6 | | | | | | | | | | | Severe skin tears and severe chevron top & bottom surface. |
| 51-7 | | | | | | | | | | | |
| 51-9 | | | | | | | | | | | |

FIG. 6

K FACTORS AND COMMENTS

| Sample Code | 8 day K-Factor | 9 day K-Factor | 10 day K-Factor | 11 day K-Factor | 12 day K-Factor | 30 day K-Factor | 60 day K-Factor | 120 day K-Factor | 180 day K-factor (projected) | 180 day K-factor (actual) | Comments |
|---|---|---|---|---|---|---|---|---|---|---|---|
| 52-3 | | | | | | | | | | | |
| 52-5 | | | | | | | | | | | |
| 53-2 | | | | | 0.181 | 0.191 | 0.198 | | 0.210 | | Flat surface with edge tears. |
| 53-4 | | | | | 0.178 | 0.189 | 0.195 | | 0.208 | | Flat smooth surface with edge tears. |
| 53-6 | | | | | | | | | | | Flat surface with edge tears, slight corrugation west & surface tears. |
| 53-8 | | | | | | | | | | | Edge tears, long surface tears resembles corrugation, board surface holding water. |
| 54-3 | | | 0.184 | | | 0.196 | | | | | Flat smooth surface with edge tears. |
| 54-6 | | | 0.183 | | | 0.196 | | | | | Flat smooth surface with edge tears. |
| 57-1 | | | | | | | | | | | smooth surface, bottom chevron, edge tears |
| 57-2 | | | | | | | | | | | smooth surface, bottom chevron, edge tears |
| 57-3 | | | | | | | | | | | slight bowing, surface imperfections |
| 58-2 | | 0.183 | | | | 0.195 | 0.202 | | | | Smooth surface |
| 58-4 | | 0.192 | | | | 0.206 | 0.211 | | | | alligator skin, slight edge tears, chevrons |
| 58-6 | | 0.212 | | | | 0.223 | 0.226 | | | | Like 58-4 only more of all |
| 59-2 | | 0.181 | | | | 0.196 | | | | | Torn edges, spongy feel, fair surface. |
| 59-4 | | | | | | | | | | | Flat smooth surface with edge tears. |
| 59-6 | | | | | | | | | | | Cell structure uniform and even. |
| 59-8 | | | | | | | | | | | |
| 59-10 | | | | | | | | | | | |
| 60-2 | | | | | | | | | | | Smooth surface, slight torn edges |
| 61-2 | | | 0.175 | | | 0.188 | | | | | Flat smooth surface with edge tears. |
| 61-3 | | | 0.180 | | | 0.193 | | | | | Flat smooth surface with edge tears. |
| 62-2 | 0.178 | | | | | | | | | | Smooth surface, edge tears, corrugations-bottom. |
| 62-3 | | | | | | | | | | | Smooth surface, surface tears-bottom. |
| 62-5 | 0.174 | | | | | | | | | | Smooth surface, drag marks top & bottom causing slight surface tears. |
| 62-6 | | | | | | | | | | | Smooth surface with slight surface tears, groove-bottom surface. |
| 62-7 | | | | | | | | | | | Smooth surface, severe skin tears. |

FIG. 6

K FACTORS AND COMMENTS

| Sample Code | 8 day K-Factor | 9 day K-Factor | 10 day K-Factor | 11 day K-Factor | 12 day K-Factor | 30 day K-Factor | 60 day K-Factor | 120 day K-Factor | 180 day K-factor (projected) | 180 day K-factor (actual) | Comments |
|---|---|---|---|---|---|---|---|---|---|---|---|
| 63-2 | | | | | | | | | | | Edges not torn, good surface |
| 64-1 | | | | 0.211 | | | | | | | Fair surface, many slight drag marks. |
| 64-2 | | | | 0.221 | | | | | | | Fair surface, many slight drag marks. |
| 64-4 | | | | | | | | | | | Fair surface, drag marks are worse. |
| 64-5 | | | | 0.231 | | | | | | | Drag marks, surface tears, torn edges, skin ripples. |
| 64-6 | | | | 0.224 | | | | | | | Drag marks, surface tears, torn edges, ripples. |
| 64-8 | | | | | | | | | | | Drag marks, surface tears, torn edges, ripples. |
| 65-2 | | | | | | | | | | | Slight ripples and tears on surface |
| 65-3 | | 0.178 | | | | | | | | | Splits and drag marks |
| 65-5 | | | | | | | | | | | Splits and drag marks |
| 65-6 | | 0.182 | | | | | | | | | Splits and drag marks |
| 66-2 | | | | 0.190 | | | | | | | Flat smooth surface with slight corrugations & skin tears. |
| 66-3 | | | | | | | | | | | Flat smooth surface with slight skin tears. |
| 66-5 | | | | 0.193 | | | | | | | Flat profile with skin tears in machine direction. |
| 66-6 | | | | | | | | | | | Flat profile with skin tears in machine direction. |
| 67-1 | | | | | | | | | | | |
| 67-2 | | | | | | | | | | | |
| 67-3 | | | | | | | | | | | |
| 67-4 | | | | | | | | | | | |

METHOD OF MANUFACTURING POLYSTYRENE FOAM WITH POLYMER PROCESSING ADDITIVES

REFERENCE TO GOVERNMENT RIGHTS

This invention was made with Government support under Advanced Technology Program (ATP) Grant No. 70NANB2H3023 awarded by the National Institute of Standards and Technology (NIST). The Government may have certain rights to this invention.

TECHNICAL FIELD AND INDUSTRIAL APPLICABILITY

This invention relates to processes for forming polymeric foams, particularly to the manufacture of extruded polystyrene (XPS) foams in the absence of chlorofluorocarbon and fluorocarbon blowing agents by using one or more esters, particularly adipates, as polymer processing aids (PPA) for improving the appearance and properties of the resulting foam, and more particularly to processes for preparing extruded polystyrene foam products from polystyrene blends using one or more of carbon dioxide, ethanol, water and an HFC, for example, HFC-134a, as the blowing agent.

BACKGROUND OF THE INVENTION

In the traditional production of polystyrene (PS) foams using an extrusion process, it was common to utilize as blowing agents one or more halocarbons, such as methyl chloride, ethyl chloride, chlorocarbons, fluorocarbons (including HFCs) and chlorofluorocarbons (CFCs) including dichlorodifluoromethane, fluorohydrocarbons or chlorofluorohydrocarbons (which are also referred to as "soft CFCs", "HCFCs" or "HFCs"). Examples of such halocarbons include a range of CFCs such as CFC-11 (chlorotrifluoromethane), CFC-12 (dichlorodifluoromethane), and CFC-113 (1,2,2-trifluoro-1,1,2-tri-chloroethane), and hydrohalocarbons, also referred to as "soft" CFCs, HCFCs and HFCs, including HCFC-22 (chlorodifluoromethane), HCFC-123 (1,1-dichloro-2,2,2-trifluoroethane), HCFC-142b (1-chloro-1,1-difluoroethane), HFC-134a (1,1,1,2-tetrafluoroethane), HFC-152a (1,1-difluoroethane), and HCFC-141b (1,1-dichloro-1-fluoroethane).

The general procedure utilized in the preparation of extruded synthetic foam bodies generally includes the steps of melting a base polymeric composition, incorporating one or more blowing agents and other additives into the polymeric melt under conditions that provide for the thorough mixing of the blowing agent and the polymer while preventing the mixture from foaming prematurely, e.g., under pressure. This mixture is then typically extruded through a single or multistage extrusion die to cool and reduce the pressure on the mixture, allowing the mixture to foam and produce a foamed product. As will be appreciated, the relative quantities of the polymer(s), blowing agent(s) and additives, the temperature and the manner in which the pressure is reduced will tend to affect the qualities and properties of the resulting foam product. As will also be appreciated, the foamable mixture is maintained under a relatively high pressure until it passes through an extrusion die and is allowed to expand in a region of reduced pressure. Although "reduced" relative to the pressure at the extrusion die, the reduced pressure region may actually be maintained at a pressure above atmospheric pressure, for example up to about 2 atm or even more in some applications, may be maintained at a pressure below atmospheric pressure, for example down to about 0.25 atm or even less in some applications. Further, unless indicated otherwise, all references to pressure provided herein are stated as the absolute pressure.

The solubility of chlorofluorocarbons and certain alkanes in polystyrene tends to reduce the extrusion melt viscosity and improve cooling of expanded polystyrene (PS) melts. For example, the combination of pentane and a chlorofluorocarbon such as Freon 11 and 12 is partially soluble in polystyrene and has been used for generating polystyrene foams that exhibited a generally acceptable appearance and physical properties such as surface finish, cell size and distribution, orientation, shrinkage and stiffness.

However, in response to the apparent contribution of such CFC compounds to the reduction of the ozone layer in Earth's stratosphere, the widespread use and accompanying atmospheric release of such compounds in applications such as aerosol propellants, refrigerants, foam-blowing agents and specialty solvents has recently been drastically reduced or eliminated by government regulation. Although certain of the "soft" CFCs such as certain hydrofluorocarbons (HFC's) including 1,1,1,2-tetrafluoroethane (HFC-134a) and 1,1-difluoroethane (HFC-152a) are thought to be much more ozone friendly and have been considered as alternative blowing agents. However, these alternative compounds are expensive, tend to be less soluble in polystyrene, tend to have higher thermal conductivity than HCFC's and may still contribute to global warming.

Hydrocarbons such as pentane, hexane, cyclopentane and other homologs of this series have also been considered, but they are highly flammable and volatile, thereby raising both safety and VOC emission concerns. Carbon dioxide is an attractive candidate as a blowing agent, from both the environmental and economic standpoints. The challenges associated with successfully using $CO_2$ as a blowing agent are, however, significant in light of the relatively low solubility, high diffusivity and poor processability of $CO_2$ in polystyrene resins. $CO_2$ also has an increased thermal conductivity relative to that of HCFC-142b and HFC-134a, with $CO_2$-blown foam exhibiting about 17% and about 10% lower overall product insulation values respectively than corresponding foams produced with HCFC-142b and HFC-134a.

Other previous attempts have utilized alcohols, such as ethanol, or hydrocarbon, such as cyclopentane, in conjunction with $CO_2$ to improve the processability and enable the production of extruded polystyrene foam board having desired or target physical and thermal properties. The problems with co-blowing agents such as alcohols or hydrocarbons are their flammability, safety and the negative impact on flame performance and insulation properties of the end product.

Conventional processes include polymer foam processes for making thermoformed articles wherein the blowing agent comprises a mixture of at least an atmospheric gas and at least one volatile plasticizing blowing agent. Previous attempts to mix normally liquid hydrocarbons and normally gaseous blowing agents have generally achieved only limited success and have tended to require great care in order to produce acceptable polymer foams using highly-volatile blowing agents such as carbon dioxide.

SUMMARY OF THE INVENTION

The objectives of the present invention include providing an improved method of making polymeric foams using a blowing system including a combination of at least two of atmospheric gases, hydrocarbons, alcohols, HFCs and/or water as a blowing agent system in combination with at least one ester, particularly an adipate ester, as a polymer processing aid.

In an exemplary embodiment of the invention, extruded polystyrene foams are prepared from a polymeric melt, typically one that includes a high melt flow polystyrene as the primary polymeric component, an atmospheric gas such as $CO_2$ in combination with at least one organic compound as the primary blowing system and at least one polymer processing aid selected from a group of esters, especially adipates having a bis(n-R) structure, wherein R is aliphatic (linear, cyclic and branched, saturated and unsaturated) or aromatic with a preferred adipate being bis(n-decanyl) adipate.

In an exemplary embodiment of the invention, the polymer melt will be prepared from a major portion of one or more styrenic polymers that exhibit a high melt index, e.g., a melt index of at least about 2.0 (g/10 minutes) (as measured according to ASTM D 1238, Condition L) or, more typically a melt index of at least about 10.0, that is combined with no more than about 5 wt % of bis(n-decanyl) adipate as a polymer processing aid and less than about 4 wt % $CO_2$ as a blowing agent, In an exemplary embodiment of the invention, the polymer melt will be prepared from preformed styrenic polymers or copolymers that may have been precompounded with bis(n-decanyl) adipate. Alternatively or additionally, the bis(n-decanyl) adipate can be injected directly into the polymeric melt at an intermediate position along the screw extruder path. In addition to the bis(n-decanyl) adipate, other processing aids may be incorporated in the preformed styrenic polymers or may be injected into the melt as it moves through the extruder. The blowing agent(s) may be injected into the polymeric melt singly or in combination at one or more intermediate positions along the screw extruder path. In any event, each of the additives and blowing agent(s) should be introduced into the polymeric melt sufficiently upstream of the extrusion die to ensure that the mixture is adequately blended before the composition reaches the extrusion die.

In accordance with the invention, the method of making polystyrene foam comprises mixing a combination of blowing agents forming a blowing system with at least one relatively non-volatile blending agent into a polystyrene melt. The polystyrene melt may also include one or more nucleating agents such as talc, sodium bicarbonate or citric acid. The mixture of the polystyrene melt, the atmospheric gas and the blending agent are then emitted through an extrusion die, thereby reducing the pressure and allowing the blowing agent to expand and form polystyrene foam. Depending on the total and relative concentrations of the blowing agents that comprise the blowing system and the extrusion conditions, the resultant foam may contain substantially no residual blowing agent and will tend to exhibit acceptable foam and surface properties.

DESCRIPTION OF THE DRAWINGS

Example embodiments of the invention will be apparent from the more particular description of certain example embodiments of the invention provided below and as illustrated in the accompanying drawings.

FIG. 3 is a table reflecting outlining various exemplary embodiments of the invention, specifically with respect to the polymer composition and the blowing agent(s) used for forming the expanded foam materials;

FIG. 4 is a table outlining various exemplary embodiments of the invention, specifically with respect to the various combinations of additives that were included in the composition used to form the expanded foam materials;

FIG. 5 is a table outlining certain properties of the various exemplary embodiments of the invention, including the vacuum condition during foaming and cell properties; and FIG. 6 is a table outlining additional properties of the various exemplary embodiments of the invention, including actual and calculated K-factors and observations as to the appearance of the foams.

DETAILED DESCRIPTION OF EXEMPLARY EMBODIMENTS

Figure 1:
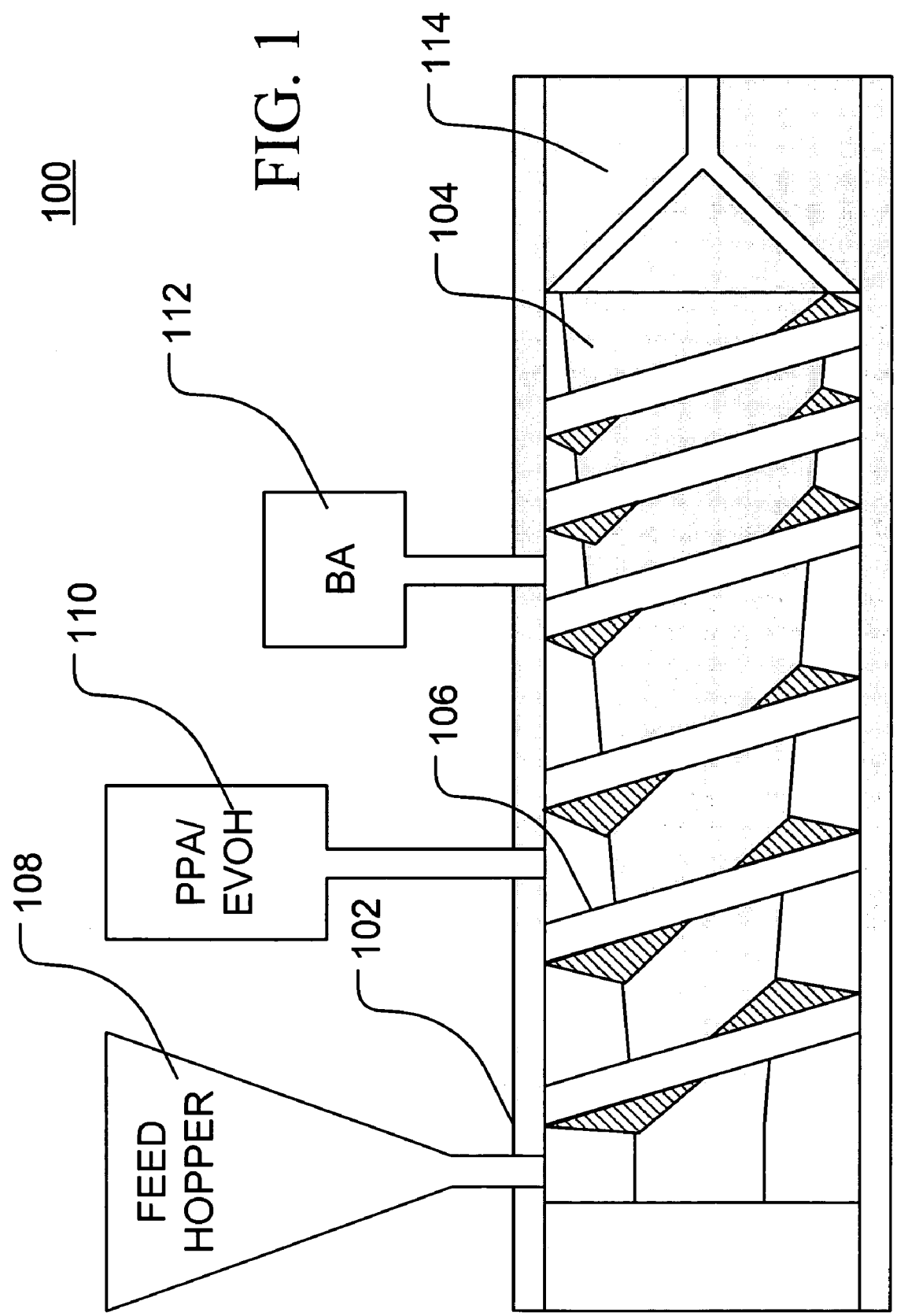
FIG. 1 is a schematic drawing of an exemplary extrusion apparatus useful for practicing methods according to the invention.

As illustrated in FIG. 1, an extrusion apparatus 100 useful for practicing methods according to the invention may comprise a single or double (not shown) screw extruder including a barrel 102 surrounding a screw 104 on which are provided a spiral flight 106 configured to compress, and thereby, heat material introduced into the screw extruder. As illustrated in FIG. 1, the basic polymeric composition can be feed into the screw extruder as a flowable solid, such as beads, granules or pellets, or as a liquid or semiliquid melt, from one or more (not shown) feed hoppers 108.

As the basic polymeric composition advances through the screw extruder, the decreasing spacing of the flight 106, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

As the polymer composition advances through the screw extruder 100, one or more ports may be provided through the barrel 102 with associated apparatus 110 configured for injecting one or more polymer processing aids into the polymer composition. Similarly, one or more ports may be provided through the barrel 102 with associated apparatus 112 for injecting one or more blowing agents into the polymer composition. Once the polymer processing aid(s) and blowing agent(s) have been introduced into the polymer composition, the resulting mixture is subjected to some additional blending sufficient to distribute each of the additives generally uniformly throughout the polymer composition to obtain an extrusion composition.

This extrusion composition is then forced through an extrusion die 114 and exits the die into a region of reduced pressure (which may be above, or more typically below atmospheric pressure), thereby allowing the blowing agent to expand and produce a polymeric foam layer or slab. The polymeric foam may be subjected to additional processing such as calendaring, water immersion, cooling sprays or other operations to control the thickness and other properties of the resulting polymeric foam product.

Figure 2:
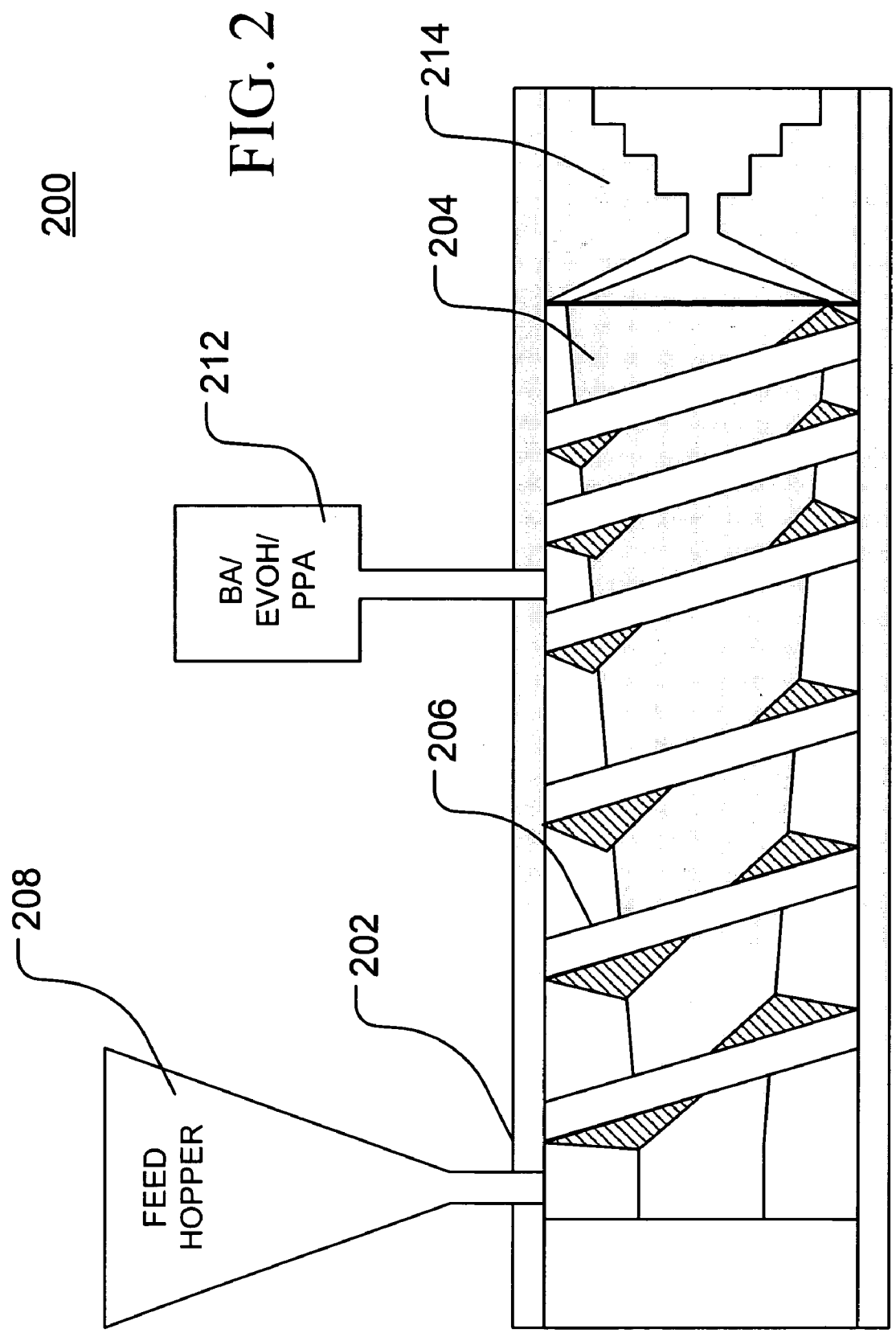
FIG. 2 is a schematic drawing of another exemplary extrusion apparatus useful for practicing methods according to the invention; and These drawings have been provided to assist in the understanding of the example embodiments of the invention as described in more detail below and should not be construed as unduly limiting the invention. In particular, the number, relative spacing, positioning, sizing and dimensions of the various elements illustrated in the drawings are not drawn to scale and may have been exaggerated, reduced or otherwise modified for the purpose of improved clarity.

As illustrated in FIG. 2, an extrusion apparatus 200 useful for practicing methods according to the invention may comprise a single or double (not shown) screw extruder including a barrel 202 surrounding a screw 204 on which are provided a spiral flight 206 configured to compress, and thereby, heat material introduced into the screw extruder. As illustrated in FIG. 2, the basic polymeric composition, optionally compounded with one or more polymer processing aids, can be feed into the screw extruder as a flowable solid, such as beads, granules or pellets, or as a liquid or semiliquid melt, from one or more (not shown) feed hoppers 208.

As the basic polymeric composition advances through the screw extruder, the decreasing spacing of the flight 206, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

As the polymer composition advances through the screw extruder 200, one or more ports may be provided through the barrel 202 with associated apparatus 212 configured for injecting one or more blowing agents and, optionally one or more polymer processing aids, into the polymer composition. Once the desired quantities of polymer, polymer processing aid(s) and blowing agent(s) have been introduced into the screw extruder, the resulting mixture is subjected to some additional blending sufficient to distribute each of the additives generally uniformly throughout the polymer composition to obtain an extrusion composition.

This extrusion composition is then forced through an extrusion die 214 and exits the die into a region of reduced pressure (which may be below atmospheric pressure), thereby allowing the blowing agent to expand and produce a polymeric foam layer or slab. As illustrated in FIG. 2, this pressure reduction may be obtained gradually as the extruded polymeric mixture advances through successively larger openings provided in the die or through some suitable apparatus (not shown) provided downstream of the extrusion die for controlling to some degree the manner in which the pressure applied to the polymeric mixture is reduced. The polymeric foam may also be subjected to additional processing such as calendaring, water immersion, cooling sprays or other operations to control the thickness and other properties of the resulting polymeric foam product.

Exemplary methods according to the invention may utilize one or more of a variety of blowing agents to achieve the desired polymeric foam properties in the final product. In general, the polymeric composition will include at least a major portion of a high melt flow polystyrene (e.g., a polystyrene having a melt flow index of at least about 2.0 g/10 minutes, or more typically, at least about 10.0 g/10 minutes (as measured according to ASTM D 1238 Condition L)) using a combination of blowing agents as a blowing system, preferably including at least one atmospheric gas, such as $CO_2$.

In addition to the blowing system, one or more polymer processing aids (PPA) selected from a group of esters, particularly adipate esters, and more particularly bis(n-R) adipate esters, wherein R is selected from a group consisting of $C_6$-$C_{16}$, and preferably $C_8$-$C_{13}$, aliphatic (linear, cyclic and branched, saturated and unsaturated) and aromatic (substituted and unsubstituted) groups, particularly compounds such as bis(n-decanyl) adipate may be added to the polymer composition. The processing aid(s) will improve the stability of the extrusion pressure/temperature profile and thereby improve the uniformity in the production of different thicknesses of polystyrene foam board using a complex blowing system.

The polymeric composition will preferably be a styrenic polymer and/or another polymer having a sufficiently high melt flow index (MFI or melt flow number), e.g., a melt flow index of at least about 2.0 (g/10 minutes), or more typically at least about 10.0, thereby increasing the blowing system solubility relative to that which can be achieved with polystyrenes having a MFI of, for example, less than about 10 alone. This polymeric composition may then be combined with minor amount of a polymer processing aid, typically an ester and preferably an adipate ester according to the general Formula I provided below:

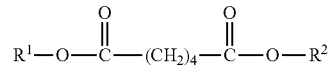

I wherein $R^1$ and $R^2$ are independently selected from a group consisting of $C_6$-$C_{16}$, and preferably $C_8$-$C_{13}$, aliphatic (linear, cyclic and branched, saturated and unsaturated) and aromatic (substituted and unsubstituted) groups (and are generally identical), or one or more of the specific adipate compounds represented by Formulas II-IV as provided below:

| ADIPATE ESTER | FORMULA |
|---|---|
| $CH_3CH_2CH_2CH(C_2H_5)CH_2CH_2-O-C(=O)-(CH_2)_4-C(=O)-O-CH_2CH_2CH(C_2H_5)CH_2CH_2CH_3$ | II |
| $C_{10}H_{21}-O-C(=O)-(CH_2)_4-C(=O)-O-C_{10}H_{21}$ | III (DENA 109) |
| $C_{13}H_{25}-O-C(=O)-(CH_2)_4-C(=O)-O-C_{13}H_{25}$ | IV (DENA 111) |

In addition to the adipate esters detailed above, other compounds corresponding to the general Formula V and reproduced below may be useful for increasing the solubility of the system in various polymeric compositions, such as polystyrene.

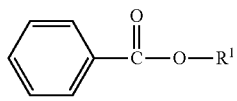

V

Suitable compounds corresponding to the general structure illustrated in Formula V for use in this invention are illustrated below as Formulas VI and VII:

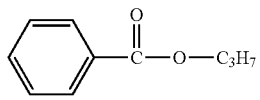

VI

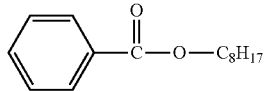

VII (DENA PF681)

A minor portion, typically less than about 5 wt %, preferably less than about 3 wt % or, perhaps, even less than about 2 wt % of a PPA, such as an adipate polymer processing aid, can be used in combination with a similar or greater concentration of the blowing agent(s). For example, bis(n-decanyl) adipate (Formula III) can be incorporated into a polymeric system or melt at a rates as low as about 0.5 wt % and still exhibit improvements to the $CO_2$ solubility, extrusion process stability as reflected by temperature/pressure profiles of the process to produce foam board exhibiting improved dimensional stability. The esters, and particularly adipate esters, will tend to outperform smaller alcohol compounds, such as ethanol, for maintaining the properties of the resulting foam board products, particularly when $CO_2$ is used as the only blowing agent.

In those instances in which the PPA is available as a liquid at or near room temperature, such as bis(n-decanyl) adipate, the PPA may be pumped through an injector and into an intermediate point in the movement of the polymeric composition through the extrusion device or extruder. Accordingly, for systems or apparatus that incorporated suitable liquid handling equipment, such as the assemblies that were utilized to inject one or more conventional PPA's such as ethanol, these same assemblies can be utilized to inject one or more of the new PPAs.

Other PPA additives such as bis(3-ethylhexyl) adipate (Formula II) and bis(n-tridecanyl) adipate (Formula N) and other similar compounds tend to exhibit similar effects with regard to improving the processability of $CO_2$ in the polymeric melt. Other polymers and copolymers such as styrene methyl methacrylate (SMMA) copolymers or methyl methacrylate (MMA) can also be utilized as the polymeric composition in methods according to the present invention and can be processed on the same apparatus as general purpose crystalline polystyrene.

With respect to copolymers in particular, utilizing bis(n-decanyl) adipate as a PPA in a SMMA copolymer composition having a S:MMA molar ratio of about 80:20 or about 83:17 is able to support about 4 wt % $CO_2$ in the extrusion composition. This polymeric composition and PPA additive scheme tends to increase blowing power and reduce the cooling demands associated with the resulting polystyrene foam board products.

Several of the PPAs, including the bis(n-decanyl) adipate, can be compounded with other polymers and copolymers such as ethylene methyl acrylate and added directly to the flowable particles, beads, pellets or other compounded forms and tend to exhibit similar effects on the foaming process in general and improving $CO_2$ solubility within the polymeric composition. The PPA compound(s) can be incorporated into the melt through direct injection into the extruder or through precompounding (blending) the PPA compound(s) with one or more of the other compatible polymers or additives to achieve similar effective concentrations in the final extrusion composition and thereby produce similar effects.

It was also noted by the inventors that the presence of bis(n-decanyl) adipate (Formula III) appears to increase the solubility of HFC-134a in the polymeric composition. Accordingly, presence of bis(n-decanyl) adipate helps support polymeric compositions using a combination of blowing agents such as HFC-134a/$CO_2$, perhaps in combination with a minor amount of $H_2O$, to produce polystyrene foam board with desired properties.

Example 1

DENA 109 (bis-(n-decanyl) adipate was blended with a polystyrene base and extruded to form composite pellets that could be used as raw extruder feed. The blend of polystyrene and DENA 109 was adjusted to provide a final melt concentration of 1.56 wt % DENA 109. 3.7 wt % $CO_2$ was introduced into the melt as a blowing agent along with a minor amount of APS 897 (15% ACTIVE GMS in PS).

The resultant foam exhibited poorly formed x-cells, edge tearing and required a relatively high die pressure, e.g., over 70 bars. The open cells varied from 3% to 45%, the resulting XPS foam had a density of 1.88 pcf and exhibited only 1635 psi compressive at 30 days. Further, samples failed dimensional stability in the gauge dimension. These parameters lead to a projected, but generally unsatisfactory, K-factor at 180 days of 0.231 to 0.241.

Example 2

DENA 109 (bis-(n-decanyl) adipate was blended with a polystyrene base and extruded to form composite pellets that could be used as raw extruder feed. The blend of polystyrene and DENA 109 was adjusted to provide a final melt concentration of 1.56 wt % DENA 109. 3.7 wt % HFC-134a was introduced into the melt as a blowing agent along with a minor amount of APS 897.

The resultant foam exhibited poorly formed x-cells, edge tearing, chevrons and required a relatively high die pressure, e.g., over 70 bars. The number of open cells was reduced, but the XPS foam density increased by about 50% at similar vacuum levels and gas volume efficiency.

Example 3

The polystyrene used for this example was NOVA's PS NN0044 S:MMA, 80:20 high melt flow polymer with $CO_2$ as a blowing agent. The polymeric component was combined with various levels of DENA 109, specifically 1.0% to 1.5%, with the 1.5% level appearing to provide the best processability. Increasing the level of $CO_2$ (from 3.7% to 4.3%) reduced the density of the resulting XPS. The particular polystyrene compound, NN0044, also tended to produce higher numbers of open cells and higher die pressure.

The 30-day compression was about 40 psi, with the XPS exhibiting poor x-cells, higher open cells and wet board edges although there did appear some reduction in the pressures required to achieve the desired surface die pressures in the 65 to 70 bars range.

Example 4

The polystyrene used for this example was NOVA's PS NN0038 with 7-8 wt % HFC-134a incorporated as a blowing agent. The polymeric component was also combined with 1.5 wt % DENA 109 and VIBA 00608 (30% ACTIVE GMS in EVA ethyl vinyl acetate) ("VIBA") polymer processing aids.

The resulting XPS exhibited a flat, smooth surface, fine cell sizes and torn edges with a die pressure of over 66 Bars, a density of 2.2 to 2.35 pcf under 11" Hg. The XPS exhibited an average cell size of about 0.166 mm with the number of open cells being below 5.0%. Aging tests at 30 days illustrated good compressive data (42-47 psi) but the density, however, is on the high side indicating less density potential when using HFC-134a rather than $CO_2$.

Example 5

The polystyrene used for this example was NOVA's PS 3100 (MFI of 12) with 3.7 wt % $CO_2$ incorporated as a blowing agent. The polymeric component was also combined with 1.5 wt % DENA 109 and VIBA 00608 polymer processing aids. Alternative runs were conducted with DENA 111 and DENA PF681, with the results being presented below in TABLE 1. It was also noted that PF681 had excellent processability and stability and at slightly lower die pressure on the average.

TABLE 1

| | DENA 109 | DENA 111 | DENA PF681 |
|---|---|---|---|
| Density @ 11" Hg, pcf | 1.96 | 2.04 | 1.92 |
| Cell size average, mm | 0.261 | 0.266 | 0.261 |
| Thickness, " | 0.96 | 0.98 | 1.00 |
| Surface, appearance | flat, smooth | flat, smooth | flat, smooth |
| Extruder out pressure, bars | 222 | 219 | 210 |
| Die pressure, bars | 70 | 64 | 64 |

Example 6

The polystyrene used for this example was NOVA's PS 3100 with 3.7 wt % $CO_2$ incorporated as a blowing agent. The polymeric component was also combined with 1.5 wt % DENA PF681 a polymer processing aids with talc being added as a nucleating agent. It was also noted that PF681 had excellent processability and stability and at slightly lower die pressure on the average.

The resulting XPS exhibited a flat smooth surface and a density of 1.95 pcf, an average cell size of 0.190 nun and a 30-compression of about 19 psi.

The DENA PF 681 was run without a process aid, and still was able to be processed at comparable die pressures to when a process aid is used. This is significant as it relates to a rate loss issue since a rate loss occurs whenever a process aid is used on the production line extruders.

Example 7

The polystyrene used for this example was a 75:25 blend of NOVA's NC0038 and NN0044 polystyrenes, 0.2 wt % nucleant, between 5.0 and 1.0 wt % XP-808 rubber (10% active). The rubber component appeared to have had little positive effect on properties of the resulting XPS foam which exhibited <3.85% open cells, a smooth flat surface, a density of approximately 2.1 pcf and required less than 67 bars of die pressure. It was noted that using 5 wt % XP-808 did appear to reduce the extruder discharge pressure by 15 bars and may be useful for reducing the pressure on the upstream side of the static cooler.

Example 8

The polystyrene used for this example was another 75:25 blend of NOVA's NC0038 and NN0044 polystyrenes, the blowing agent also included water as a co-blowing agent. The water was introduced into the melt via a 50% effective active pellet CELLFOAM-H-800X-50C. Only one of the samples prepared in connection with this example included references to VIBA608 (on 2 samples) and with VIBA on one sample.

The resulting foam exhibited relatively low density <1.85 pcf, reduced numbers of open cells <2.9%, maintains a die pressure of less than 69 bars and process an XPS having an average cell 0.185 mm w/o VIBA608 and 0.225 mm w/VIBA608. This recipe was particularly promising because the processibility was improved as a result of the inclusion of MMA (through the SMMA copolymer). The addition of the $H_2O$ as a co-blowing agent that adds to the gas volume and cooling potential during manufacture of the foam.

Example 9

The polystyrenes used for this example were a series of blends of NOVA's NC0038 and NN0044 polystyrenes selected to provide increasing levels of MMA, specifically 5%, 10%, 15% and 20% by weight MMA. The blowing system was a combination of 3.7 wt % $CO_2$ and 0.5 wt % $H_2O$ with 1.5 wt % DENA 109 and 0.5 wt % with VIBA608 as an additional PPA and 0.2 wt % talc as a nucleating agent.

The resulting foamable mixtures were processed with die pressures of less than 67 bars, reflected good system stability and produced a smooth, flat foam surface. The density of the resulting XPS foam decreased with increasing concentrations of MMA with the open cells for the four concentrations being:
5% MMA=3.13%
10% MMA=4.24%
15% MMA=24.35%
20% MMA=46.16%

It appears, therefore, that the MMA level should be maintained at or below <10%, e.g., a 50/50 blend of NC0038 and NN0044, to maintain the number of open cells at acceptable levels. It may be that the increasing number of open cells at the higher MMA levels is due at least in part to less uniform mixing of the blends. Similar compositions at higher screw speeds or longer extruders may provide some improvement in this regard.

Example 10

The polystyrenes used for this example was a 75/25 blend of NOVA's NC0038 and NN0044 polystyrenes selected to provide 5% MMA. The blowing system was a combination of 3.7 wt % $CO_2$ and 0.5 wt % $H_2O$ with varying levels of HFC-134a, specifically 0, 2 wt % and 4 wt %, 1.5 wt % DENA 109 and 0.2 wt % talc as a nucleating agent.

The compositions were processed with a die pressure of less than 60 bars, but the resulting XPS foam exhibited surface tears. It is expected that the addition of one or more PPAs selected from a group consisting of VIBA608, POLYAID 721 OR LOTRYL EMA would improve the surface condition.

Example 11

The polystyrene used for this example was NOVA's NC0038 polystyrene. The blowing system was 7 wt % HFC-134a with and without and 1 wt % $CO_2$, 1.5 wt % DENA 109 and 0.05 wt % talc as a nucleating agent. LOTRYL 28MA07 at 0.2 wt % was included as an additional PPA.

The resulting XPS foam quality was a function of the extruder screw rate with poor results being obtained at 18 rpm and much better results being obtained at 27 rpm for the same composition. The higher rpm foam exhibited a smooth surface, large average cells and a relatively low level of open cells <3.52%. It is anticipated that increasing the amount of the nucleating agent and including a minor concentration, 0.5 wt % H2O would decrease the average cell size. One or more additional PPAs, for example POLYAID 721 and/or LOTRYL EMA would also tend to improve the resulting foam.

Example 12

The polystyrenes used for this example were NOVA's NC0038 polystyrene and a 75/25 blend of NOVA's NC0038 and NN0044. The blowing system was 6 wt % HFC-134a, 1.5 wt % $CO_2$ and 0.5 wt % $H_2O$ with 1.5 wt % DENA 109 and 0.5 wt % talc as a nucleating agent. Both LOTRYL 28MA07, at 0.2 wt %, and POLYAID 721, at 1.0 wt %, were included as PPAs.

The XPS foam was produced with a die pressure of less than 64 bar to produce a foam having a density of 1.87 pcf.

Example 13

The polystyrenes used for this example were NOVA's NC0038 polystyrene and a 75/25 blend of NOVA's NC0038 and NN0044. The blowing system was 4-7 wt % HFC-134a, 1.5 wt % $CO_2$ and 0.5 wt % $H_2O$ with 1.5 wt % DENA PF681 and 0.05-0.2 wt % talc as a nucleating agent. VIBA608 was included in some samples at 0.33 wt %.

The resulting XPS foam was extruded at die pressures from 67 to 53 bar to produce foams having densities from 2.64 to 1.83 pcf and relatively large cell sizes.

In general, better results have been achieved using blowing systems comprising a combination of blowing agents and PPAs, particularly DENA 109 and DENA PF681 in combination with a blend of HFC-134a, $CO_2$, and optionally water, in combination with a polystyrene blend that includes up to about 5 wt % MMA. One such blowing system recipe is 4.43 wt % HFC-134a, 2.0 wt % $CO_2$ with 0.9 wt % DENA PF681. When present, the water may be incorporated using a concentrated pellet which contains 50% $H_2O$ by weight and commercially available as CELLFOAM H-800X-50HC. Another blowing system recipe is 4.62 wt % HFC-134a, 2.05 wt % $CO_2$, 0.92 wt % DENA PF681 and 0.5% $H_2O$ with which densities as low as 1.88 pcf and average cells of about 0.16 mm were obtained.

The use of the DENA 109 and DENA PF681 PPA's allowed the production of acceptable XPS foams without the addition of ethanol, thereby avoiding the associated safety issues while still producing foams with small cell sizes. Other PPAs, for example APS 897 and VIBA 00608, both of which contain GMS, can be used to address to some degree any loss of throughput rate.

As noted above, the disclosed apparatus and methods of making polystyrene based foam products using one or more atmospheric gases and/or a halohydrocarbon as the primary blowing agent(s) in combination with a polymer processing aid comprising one or more esters, particularly adipates. Further, as the polystyrene foam is extruded, the melt can be foamed and cooled to a degree sufficient to maintain generally normal process levels and can, accordingly, be controlled with conventional practices for obtaining foam products adapted for particular final uses. These conventional practices may be adapted for use with the present invention to provide some degree of control over the foam density and cell size while utilizing conventional extrusion apparatus and post-extrusion processing.

Although the invention has been described in the context of particular polystyrene foam materials, the inventive method is also applicable to other polymeric compositions and various combinations of blending agents to obtain a variety of polymeric foam materials. Example embodiments of the invention have been disclosed herein and, although specific terms are employed, they are used and are to be interpreted in a generic and descriptive sense only and not for purpose of limitation. Accordingly, it will be understood by those of ordinary skill in the art that various changes in form and details of the disclosed apparatus and methods may be made without departing from the spirit and scope of the invention as set forth in the following claims.

What is claimed is:

1. A method of manufacturing extruded polymeric foam, comprising:
    preparing a polymeric melt from a major amount of a polymer composition having a melt flow index of at least about 2.0 wherein the polymer composition includes a major portion of polystyrene by weight and a minor amount of an adipate having the formula

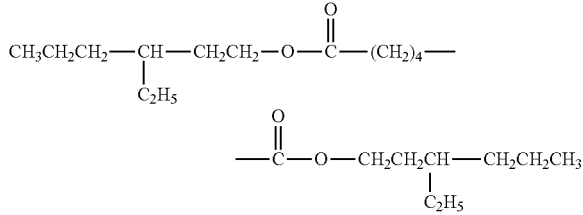

injecting a blowing system into the polymeric melt to form a foamable mixture, the blowing system comprising $CO_2$, one or more blowing agent, and optionally water, said one or more blowing agent being selected from HCFC-22, HCFC-123, HCFC142b, HFC-134a, HFC-152a, HCFC-141b and mixtures thereof; and
    extruding the foamable mixture through a die at a die pressure into a region of reduced pressure to form said extruded polymeric foam.

2. The method of manufacturing extruded polymeric foam according to claim 1, wherein: the polymer composition has a melt flow index of at least about 10.0.

3. The method of manufacturing extruded polymeric foam according to claim 1, wherein: the polymer composition is substantially all polystyrene.

4. The method of manufacturing extruded polymeric foam according to claim 1, wherein the adipate represents no more than about 1.5% by weight of the foamable mixture.

5. The method of manufacturing extruded polymeric foam according to claim 1, wherein: the adipate represents from about 0.5% to about 3.0% by weight of the foamable mixture.

6. The method of manufacturing extruded polymeric foam according to claim 1, wherein:
the polymer composition includes a major portion of polystyrene;
the $CO_2$ represents about 3.7% by weight of the foamable mixture;
the reduced pressure is between about 101.3 kPa and about 47.3 kPa; and
the resulting expanded foam has an average cell size of less than about 0.3 mm and a density of from about 1.7 to about 2.3 pcf.

7. The method of manufacturing extruded polymeric foam according to claim 1, wherein:
the polymer composition includes a major portion of polystyrene;
the reduced pressure is between about 202.7 kPa and about 25.3 kPa; and
the resulting expanded foam has an average cell size of less than about 0.3 mm and a density of from about 1.7 to about 2.3 pcf.

8. The method of manufacturing extruded polymeric foam according to claim 1, wherein:
the polymer composition includes a major portion of polystyrene;
the reduced pressure is between about 101.3 kPa and about 47.3 kPa; and
the resulting expanded foam has an average cell size of less than about 0.3 mm and a density from about 1.7 to about 2.3 pcf.

9. The method of manufacturing extruded polymeric foam according to claim 1, wherein said polymer melt further includes methyl methacrylate in an amount less than 10% by weight.

10. A method of manufacturing extruded polymeric foam comprising:
Preparing a polymeric melt from a major amount of a polymer composition having a melt flow index of at least about 2.0 wherein the polymer composition includes a major portion of polystyrene by weight and a minor amount of at least one adipate having the formula

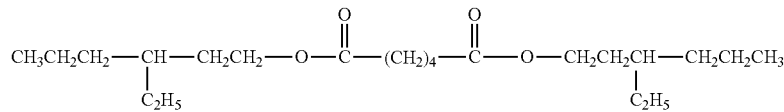

injecting a blowing system into the polymeric melt to form a foamable mixture, the blowing system comprising less than 4 wt % $CO_2$, one or more HFC, and optionally water; and extruding the foamable mixture through a die at a die pressure into a region of reduced pressure to form said extruded polymeric foam, wherein said adipate represents no more than about 3 wt % of said foamable mixture, and
wherein said adipate is present in said foamable mixture in combination with a similar or greater amount of said blowing system.

11. The method according to claim 10 wherein:
said one or more HFC is selected from HCFC-22, HCFC-123, HCFC-142b, HFC-134a, HFC-152a, HCFC-141b and mixtures thereof; and
the polymer composition has a melt flow index of at least about 10.0.

12. The method according to claim 10, wherein said adipate represents no more than about 1.5% by weight of said foamable mixture.

13. The method according to claim 10, wherein said adipate represents from about 0.5% to about 3.0% by weight of said foamable mixture.

14. A method of manufacturing an extruded polymeric foam, comprising:
preparing a polymeric melt from
(1) a major amount of a polymer composition having a melt flow index at least about 2.0 wherein the polymer composition includes a major portion of polystyrene by weight; and
(2) a minor portion of at least one compound according to Formula V;

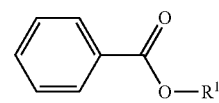

wherein $R^1$ is selected from $C_8$-$C_{13}$ aliphatic and $C_6$-$C_{16}$ aromatic groups;
injecting a blowing system into the polymeric melt to form a foamable mixture, the compound according to formula V increasing the solubility of the blowing system, said blowing system including $CO_2$, one or more blowing agent selected from HCFC-22, HCFC-123, HCFC-142b, HFC-134a, HFC-152a, HCFC-141b and mixtures thereof, and optionally water; and
extruding the foamable mixture through a die into a region of reduced pressure to form said polymeric foam.

15. The method of manufacturing extruded polymeric foam according to claim 14, wherein: the polymer composition has melt flow index of at least about 10.0.

16. The method of manufacturing extruded polymeric foam according to claim 14, wherein: the polymer composition is substantially all polystyrene.

17. The method of manufacturing extruded polymeric foam according to claim 14, wherein: the blowing system includes $CO_2$ in an amount of at least about 3.5% by weight of the foamable mixture.

18. The method of manufacturing extruded polymeric foam according to claim 14, wherein: the blowing system includes $CO_2$ in an amount of at least about 3.5% by weight of the foamable mixture.

19. The method of manufacturing extruded polymeric foam according to claim 14, wherein: the region of reduced pressure is between about 101.3 kPa and about 47.3 kPa.

20. The method of manufacturing extruded polymeric foam according to claim 14, wherein; the region of reduced pressure is between about 202.7 kPa and about 25.3 kPa.

21. The method of manufacturing extruded polymeric foam according to claim 14, wherein said polymer melt further included methyl methacrylate in an amount less than 10% by weight.

22. The method of manufacturing extruded polymeric foam according to claim 14, wherein $R_1$ is selected from $C_6$-$C_{16}$ aromatic groups.

23. The method of manufacturing extruded polymeric foam according to claim 15, wherein $R^1$ is selected from $C_8$-$C_{13}$ aromatic groups.

* * * * *